US007398299B1

(12) United States Patent
Ying

(10) Patent No.: US 7,398,299 B1
(45) Date of Patent: Jul. 8, 2008

(54) CONTROL NETWORK WITH MATRIX ARCHITECTURE

(75) Inventor: Jeffrey Ying, Glendora, CA (US)

(73) Assignee: I/O Controls Corporation, Azusa, CA (US)

( * ) Notice: Subject to any disclaimer, the term of this patent is extended or adjusted under 35 U.S.C. 154(b) by 482 days.

(21) Appl. No.: 10/646,459

(22) Filed: Aug. 22, 2003

Related U.S. Application Data

(63) Continuation of application No. 09/442,368, filed on Nov. 17, 1999, now Pat. No. 6,611,860.

(51) Int. Cl.
*G06F 13/00* (2006.01)

(52) U.S. Cl. .................. 709/208; 709/223; 709/251; 714/43

(58) Field of Classification Search .......... 709/208, 709/223, 224, 251, 230, 239; 714/4, 43; 700/3
See application file for complete search history.

(56) References Cited

U.S. PATENT DOCUMENTS

| | | | |
|---|---|---|---|
| 3,890,471 A | 6/1975 | Hachenburg | 179/15 |
| 4,251,858 A | 2/1981 | Cambigue et al. | 364/132 |
| 4,435,704 A | 3/1984 | Hashimoto et al. | 370/223 |
| RE31,852 E | 3/1985 | Soderblom | 370/86 |
| 4,527,270 A | 7/1985 | Sweeton | 370/224 |
| 4,579,407 A | 4/1986 | Shimada | 339/29 |
| 4,610,013 A | 9/1986 | Long et al. | 395/182.09 |
| 4,634,110 A | 1/1987 | Julich et al. | 364/131 |
| 4,812,943 A | 3/1989 | Jones et al. | 361/95 |
| 4,814,984 A | 3/1989 | Thompson | |
| 4,973,953 A | 11/1990 | Shimokawa et al. | 370/223 |
| 5,003,579 A | 3/1991 | Jones | 379/93 |
| 5,117,430 A | 5/1992 | Berglund | 340/825.02 |
| 5,423,024 A | 6/1995 | Cheung | |
| 5,455,959 A | 10/1995 | Simmering | |

(Continued)

FOREIGN PATENT DOCUMENTS

JP 59062968 4/1984

(Continued)

*Primary Examiner*—Kenneth R Coulter
(74) *Attorney, Agent, or Firm*—Irell & Manella LLP

(57) ABSTRACT

A multi-tier, master-slave control network has a matrix architecture for facilitating monitoring, command and control of the mid- and lower-tiers of the control network. A supervisory network is connected to a hierarchical master-slave control network, and includes a set of supervisory nodes connected to various different buses of the main hierarchical master-slave control network. In one embodiment, the supervisory network comprises a multi-master data bus, and each of the supervisory nodes can control and communicate across the supervisory data bus in a manner similar to a local area networks such as an Ethernet. In another embodiment, the supervisory network is a master-slave network, with a supervisory master node controlling a set of supervisory slave nodes, each of which connects to one of the lower-tier buses. The matrix architecture created by the addition of the supervisory network allows convenient monitoring of the lower-tier buses by the first-tier master node. The supervisory nodes may provide redundant backup control for the data buses which they monitor. Redundant backup for the master node on each data bus is also provided by outfitting the slave nodes with means for detecting a failure of the master node and for taking over for the master node upon a failure.

45 Claims, 18 Drawing Sheets

U.S. PATENT DOCUMENTS

| | | | |
|---|---|---|---|
| 5,461,608 A | 10/1995 | Yoshiyama | |
| 5,544,314 A | 8/1996 | Fuchsreiter et al. | |
| 5,583,754 A | 12/1996 | Leonhardt et al. | |
| 5,751,220 A | 5/1998 | Ghaffari | 340/825.21 |
| 5,802,043 A | 9/1998 | Skillen et al. | 370/258 |
| 5,809,220 A | 9/1998 | Morrison et al. | |
| 5,907,486 A | 5/1999 | Ying | |
| 6,061,600 A | 5/2000 | Ying | 700/3 |
| 6,094,416 A | 7/2000 | Ying | 370/222 |
| 6,147,967 A * | 11/2000 | Ying et al. | 370/222 |
| 6,201,995 B1 | 3/2001 | Ying | 700/3 |
| 6,282,583 B1 * | 8/2001 | Pincus et al. | 713/375 |
| 6,389,451 B1 | 5/2002 | Hart | 709/201 |
| 6,611,860 B1 * | 8/2003 | Ying | 709/208 |
| 6,643,689 B2 * | 11/2003 | Rode et al. | 709/209 |
| 2003/0006647 A1 * | 1/2003 | Rode et al. | 307/9.1 |

FOREIGN PATENT DOCUMENTS

| | | |
|---|---|---|
| JP | 61161568 | 7/1986 |
| JP | 04286239 | 10/1992 |
| JP | 04299429 | 10/1992 |
| JP | 05088996 | 4/1993 |
| JP | 10-326259 | 12/1998 |
| JP | 10-333930 | 12/1998 |

* cited by examiner

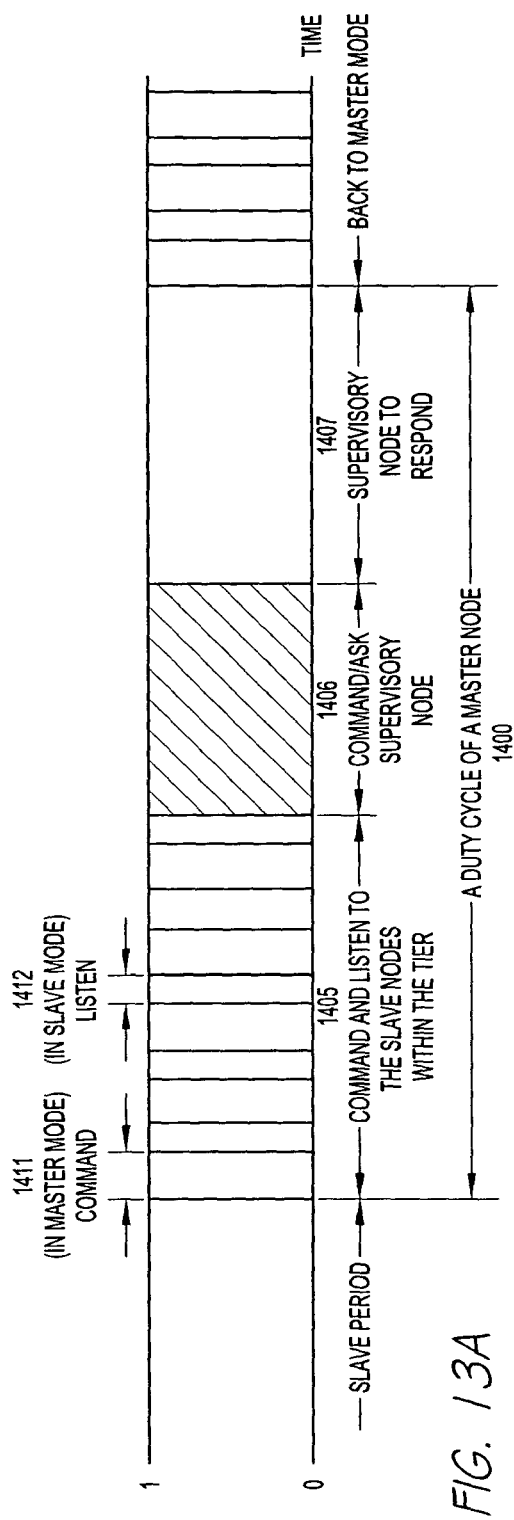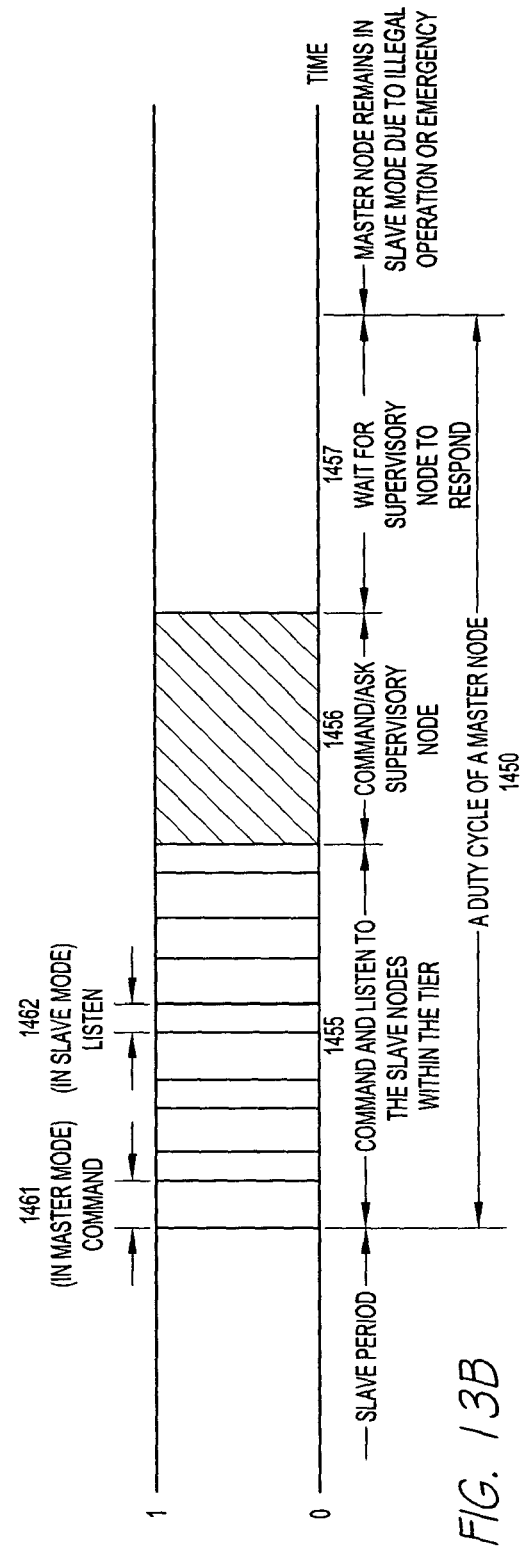
FIG. 13A
FIG. 13B

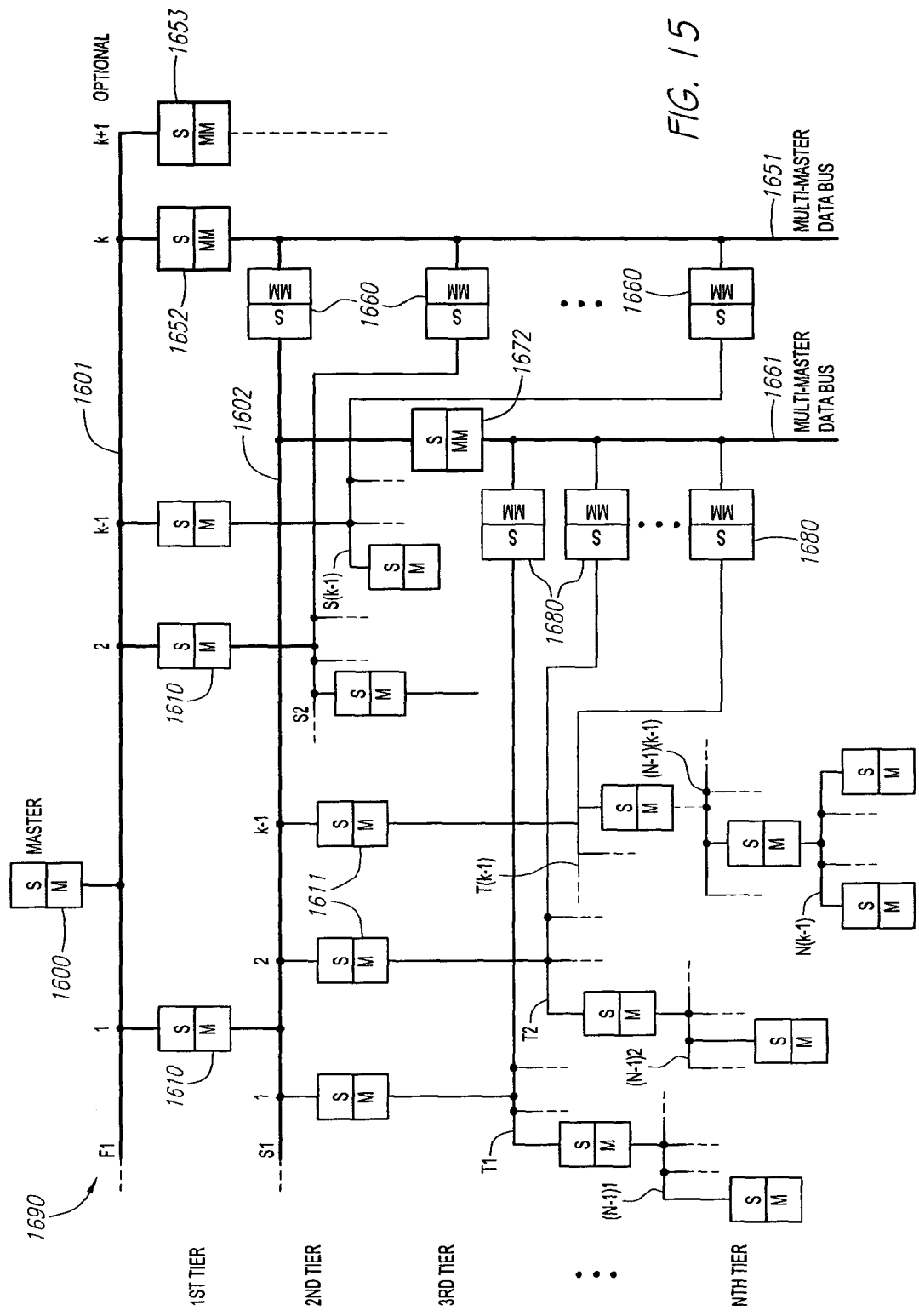

ed on Nov. 17, 1999, now U.S.
CONTROL NETWORK WITH MATRIX ARCHITECTURE

CROSS REFERENCE TO RELATED APPLICATIONS

This application is a continuation application of U.S. application Ser. No. 09/442,368, filed on Nov. 17, 1999, now U.S. Pat. No. 6,611,860. The foregoing application is hereby incorporated by reference as if set forth fully herein.

BACKGROUND OF THE INVENTION

1) Field of the Invention

The field of the invention pertains to methods and apparatus for implementing a control network and, more particularly, to a control network architecture and methods for connecting nodes in a control network.

2) Background

Automated control systems are commonly used in a number of manufacturing, transportation, and other applications, and are particularly useful to control machinery, sensors, electronics, and other system components. For example, manufacturing or vehicular systems may be outfitted with a variety of sensors and automated electrical and/or mechanical parts that require enablement or activation when needed to perform their predefined functions. Such systems commonly require that functions or procedures be carried out in a prescribed order or with a level of responsiveness that precludes sole reliance on manual control. Also, such systems may employ sensors or other components that require continuous or periodic monitoring and therefore lend themselves to automated control.

As the tasks performed by machinery have grown in number and complexity, a need has arisen for ways to exercise control over the various components of a system rapidly, efficiently and reliably. The sheer number of system components to be monitored, enabled, disabled, activated, deactivated, adjusted or otherwise controlled can lead to difficulties in designing and implementing a suitable control system. As the number of system components to be controlled is increased, not only is the operation of the control system made more complicated, but also the wiring and inter-connections of the control system are likewise more elaborate. In addition, greater reliance on automated control has resulted in larger potential consequences if the automated control system fails.

Traditionally, control systems in certain applications, such as transit vehicles and railcars, have relied upon relay-based control technology. In such systems, relays and switches are slaved to a logic circuit that serves to switch signal connections. This approach requires a large number of relays and a substantial amount of wiring throughout the vehicle. In some instances distributed processors or logic circuits may be used for subsystems such as the door, but these processors or logic circuits often take up significant space and can be costly to maintain.

A substantial improvement has recently been made in the field of control systems. An improved network control system recently developed uses a dual-bus architecture along with distributed controllers. In this improved network control system, a primary bus forms a high-speed, bi-directional communication link interconnecting a main data bus controller with distributed slave modules, one of which acts as a second data bus controller connected to a secondary, low-speed data bus. The slave modules are generally connected to various input/output ports. The second data bus controller can be connected to second-tier slave modules over the secondary, low-speed data bus. The main data bus controller, secondary data bus controller, first-tier slave modules, second-tier slave modules, input/output ports and other system components collectively form a hierarchical system wherein the main data bus controller supervises the first-tier slave modules, including the second data bus controller, the second data bus controller supervises the second-tier slave modules, and the first-tier slave modules and second-tier slave modules supervise their assigned input/output functions.

While the dual-bus control network as described above has many advantages, there are also ways in which it could be improved further. The dual-bus control network architecture as currently known in the art generally relies on a single top-level main data bus controller. If the main data bus controller fails, system performance will be adversely impacted. Also, the possibility of a short circuit occurring, particularly over a region of the bus, is a constant danger. In addition to disrupting communication signals among the components accessing the bus, a short circuit can be difficult to trace and cause substantial disruption of system service while maintenance personnel attempt to locate the short circuit. Furthermore, while the dual-bus network control architecture reduces wiring needed in a vehicle or other automated system, simplification of wiring connections would lead to greater ease of implementation and maintenance.

Accordingly, it would be advantageous to provide a network control system that has a means for recovering from a failure in a main data bus controller or otherwise mitigating the effects such a failure. It would further be advantageous to provide a network control system that reduces the impact of a short circuit and enables rapid identification of the location of a short circuit by maintenance personnel. It would further be advantageous to provide a distributed network control system with simplified wiring and connections.

In addition, as hierarchical control networks grow in size and complexity, it becomes increasingly difficult for the master node or controller to communicate with nodes located remotely, separated often by a number of intervening, mid-level nodes or other intermediaries. Accordingly, it would be advantageous to provide a hierarchical control network which facilitates communication between the master node and lower level nodes.

SUMMARY OF THE INVENTION

According to one aspect of the invention, a control network is provided in which communication is facilitated between a master node and lower level nodes. In a preferred embodiment as described herein, a multiple-bus hierarchical control network includes a first-tier common bus and a plurality of lower-tier common buses. A first-tier master node controls a plurality of first-tier slave nodes using the first-tier common bus for communication. Each of the first-tier slave nodes may be connected to a separate second-tier common bus, and each operates as a respective second-tier master node for a plurality of second-tier slave nodes connected to the particular second-tier common bus associated with the first-tier slave/second-tier master node. Likewise, each of the second-tier slave nodes may be connected to a separate third-tier common bus, and each would then operate as a respective third-tier master node for a plurality of third-tier slave nodes connected to the particular third-tier common bus associated with the second-tier slave/third-tier master node. A supervisory network is connected to one or more of the lower-tier buses as well as to the first-tier common bus, so that activity on the lower-tier buses can be monitored by the first-tier master node.

In a preferred embodiment, the supervisory network comprises a first-tier supervisory master node connected to a common supervisory data bus. A plurality of supervisory slave nodes are connected to the supervisory data bus. Each of the supervisory slave nodes is also connected to one of the lower-tier buses, and each supervisory slave node monitors the communications occurring on the particular lower-tier bus. Information monitored by the supervisory slave nodes is communicated over the supervisory data bus to the first-tier supervisory master node either as needed, or on a regular basis, and can be relayed to the first-tier master node by the first-tier supervisory master node over the first-tier common bus.

If the control network is large and/or has many levels, then the supervisory network can be expanded by providing additional lower-tier supervisory levels, including lower-tier supervisory buses, configured with a control structure similar to the hierarchical control network absent the supervisory network. The resulting preferred network structure may be viewed as having a "matrix" architecture due to the intersection of control paths emanating downward from a single master node with the supervisory paths emanating across the control network from a single supervisory master node.

In a preferred embodiment, communication over a common bus is carried out using time division multiplexing. A time slot may be set aside for communication between the master node and the supervisory node connected to the common bus.

In another embodiment, a multi-master data bus supervisory network is connected to a hierarchical master-slave control network, wherein the multi-master data bus supervisory network monitors the activity on the various buses of the hierarchical master-slave control network. Activity on the various buses of the hierarchical master-slave control network is communicated to the upper tier master node(s) by relaying the necessary information over a multi-master data bus of the multi-master data bus supervisory network, which is generally much faster than attempting to relay the same information upwards tier-by-tier in the hierarchy of the hierarchical master-slave control network.

Various other embodiments as described herein provide for redundant backup control of the active master node on a common data bus. In a preferred embodiment, should a failure of the first-tier master node occur, any of the first-tier slave nodes connected to the first common bus can take over the first-tier master node, doing so according to their programmed priority. Should a failure of the second-tier master node occur, any of the second-tier slave nodes connected to a second common bus can take over the second-tier master node, doing so according to their programmed priority. Redundant master control is thereby provided for both the first tier and second tier in the hierarchical control network. Similar redundant backup control may be provided for any other common buses provided in the system organized in a master-slave hierarchy.

A preferred node comprises two separate transceivers, an uplink transceiver for receiving control information, and a downlink transceiver for sending out control information. Each node therefore has the capability of performing either in a master mode or a slave mode, or in both modes simultaneously.

In a preferred embodiment of the invention, a master node serves as a controller for a multiplicity of slave nodes. The master node polls the slave nodes periodically. Each of the slave nodes comprises a failure mode detector whereby, if a slave node fails to receive a message from the master node within a certain fixed period of time, then the slave node takes over control for the master node.

The invention provides in one aspect an automatic redundant backup master control for a master control node in a distributed, intelligent control network.

Further variations and embodiments are also disclosed herein, and are described hereinafter and/or depicted in the figures.

BRIEF DESCRIPTION OF THE DRAWINGS

FIGS. 13A and 13B are timing diagrams for communication in a hierarchical control network having a matrix architecture, such as illustrated in FIG. 11 or 12.

FIG. 15 is a diagram of a hierarchical control network having a matrix architecture and utilizing one or more multi-master buses.

DETAILED DESCRIPTION OF THE PREFERRED EMBODIMENT(S)

This application is generally related to U.S. Pat. No. 5,907, 486 entitled "Wiring Method and Apparatus for Distributed Control Network," U.S. patent application Ser. No. 08/854, 160 filed in the name of inventor Jeffrey Ying, entitled "Backup Control Mechanism in a Distributed Control Network," U.S. patent application Ser. No. 08/853,893 filed in the name of inventors Jeffrey Ying and Michael Kuang, entitled "Fault Isolation and Recovery In A Distributed Control Network," and U.S. patent application Ser. No. 08/853,989 filed in the name of inventor Jeffrey Ying, entitled "Multi-Tier Architecture for Control Network," all of which foregoing are hereby incorporated by reference as if set forth fully herein.

Figure 1:
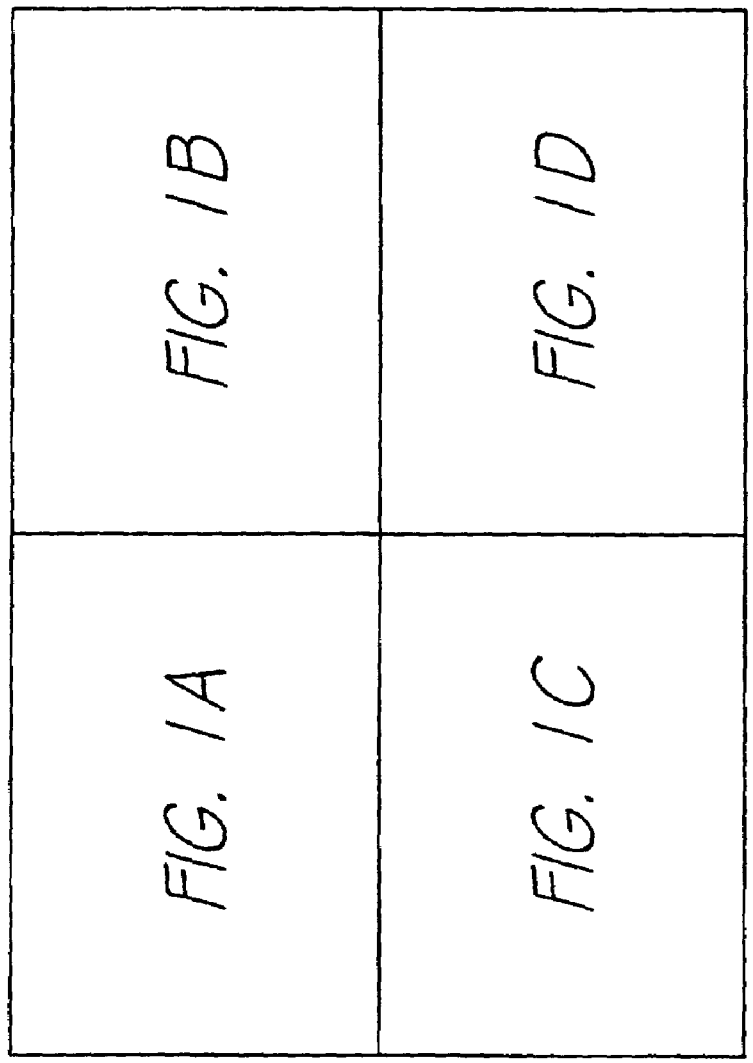
FIG. 1 is a diagram of a distributed control network with two data buses as known in the prior art.
Figure 1A:
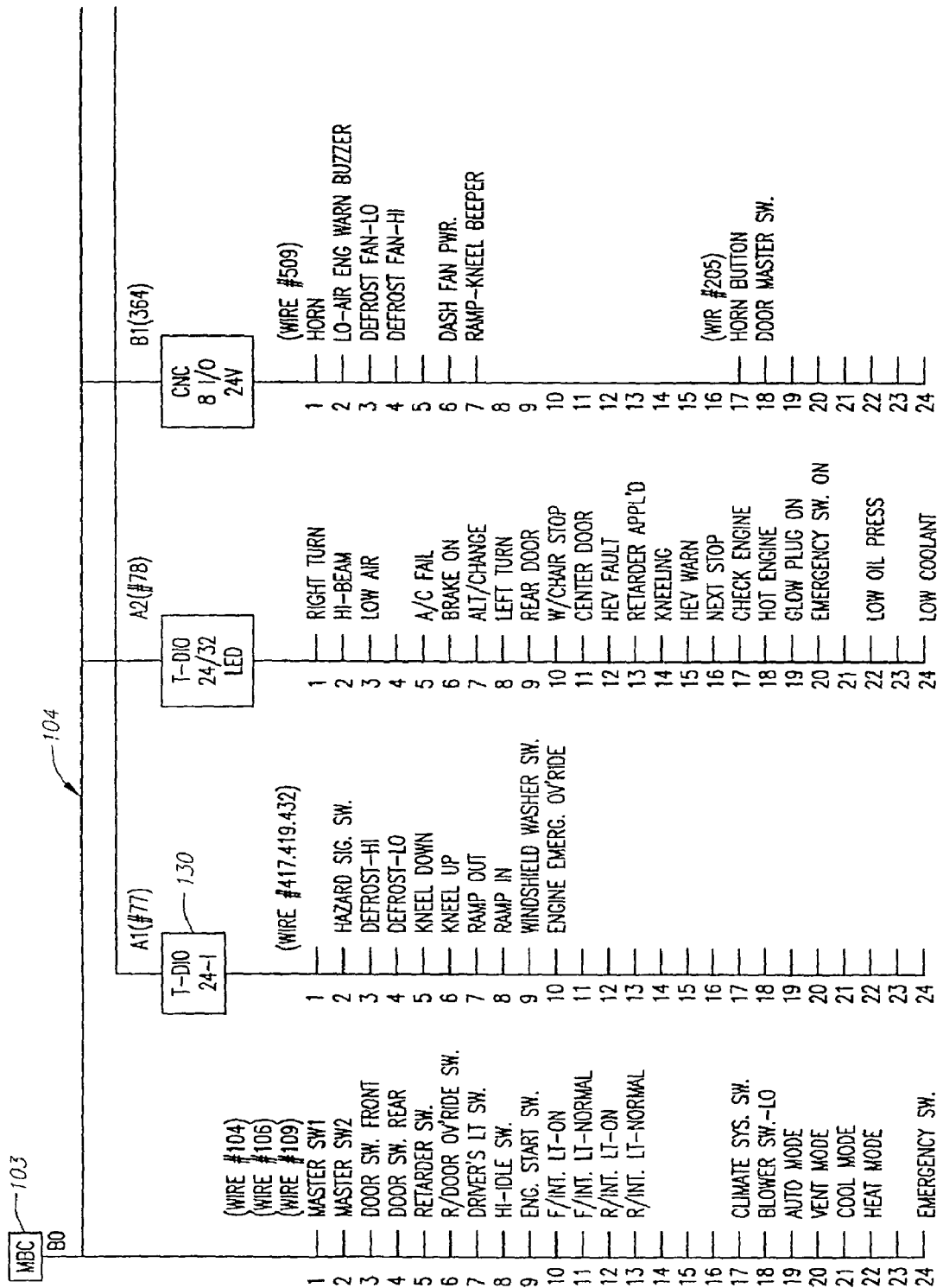
Figure 1B:
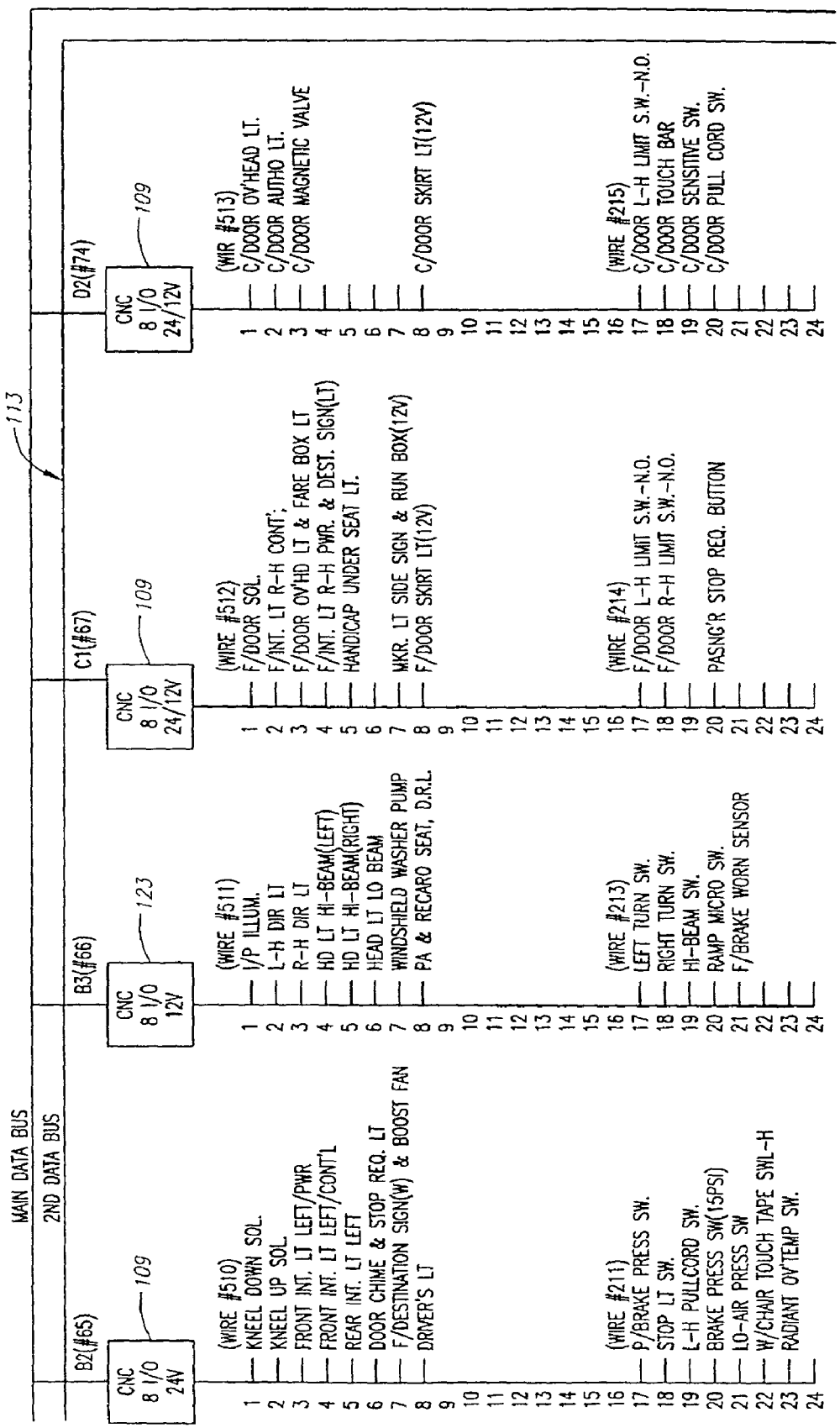
Figure 1C:
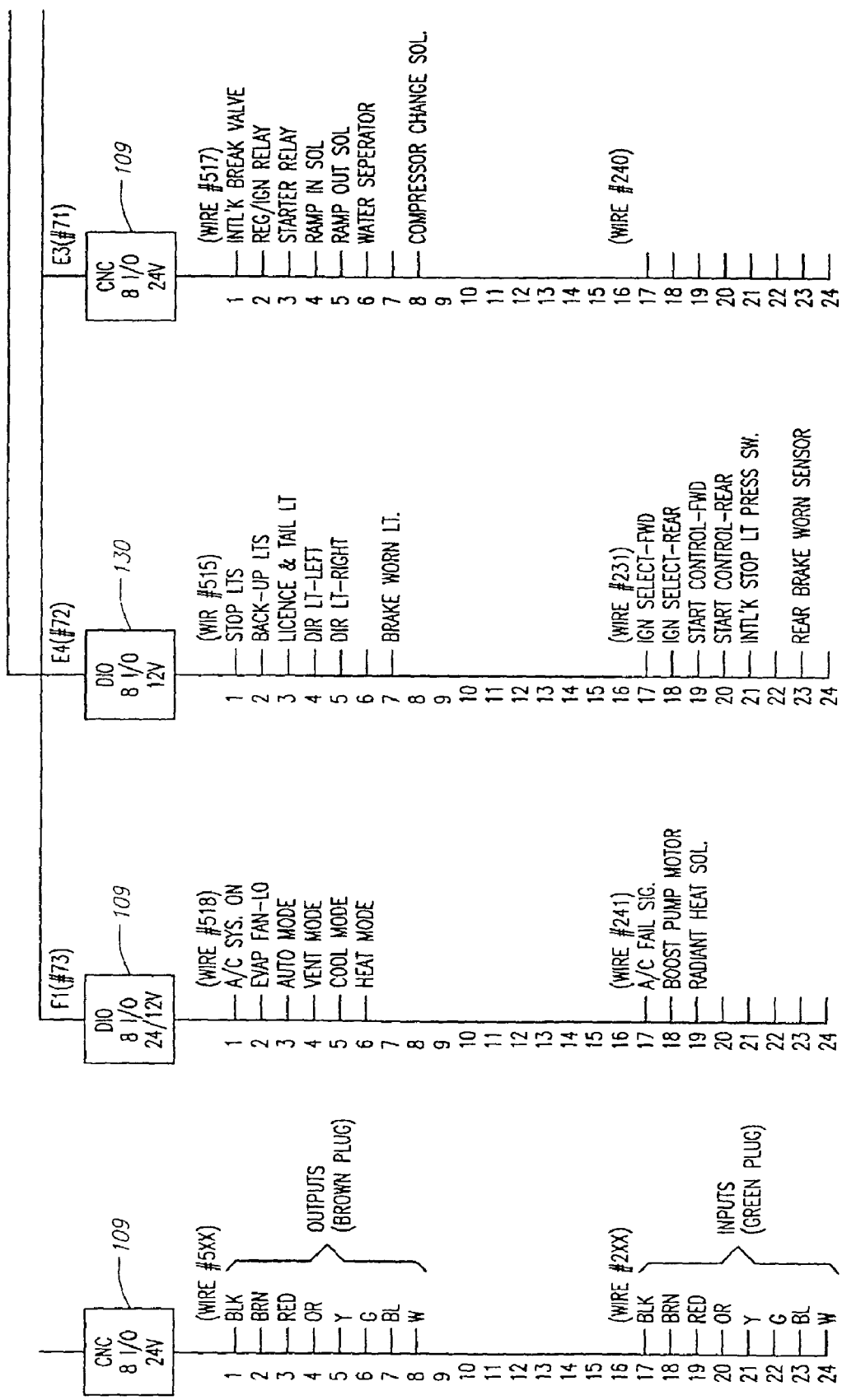
Figure 1D:
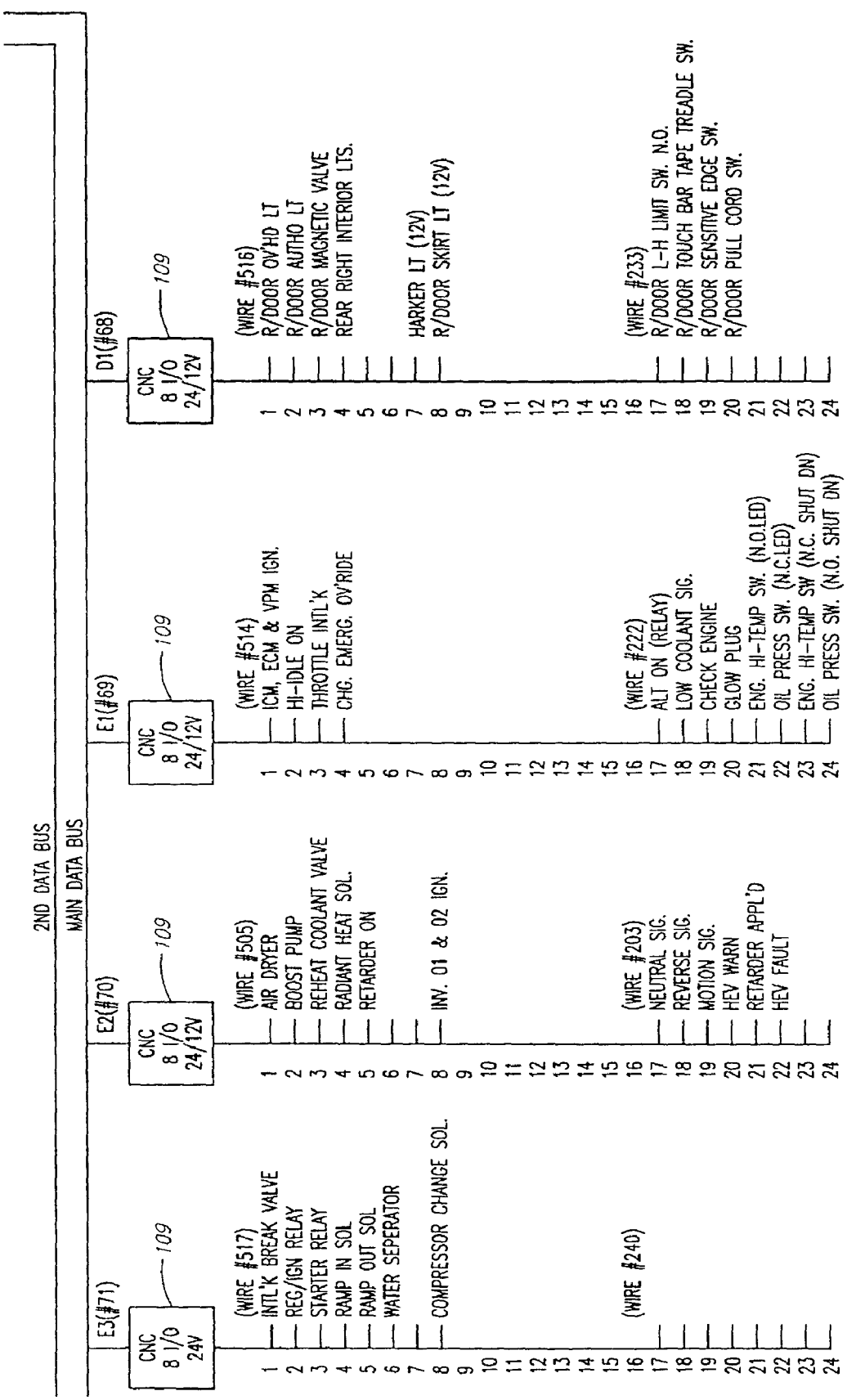

FIG. 1 is a block diagram showing the interconnection of nodes in a particular type of control network 101 as known in the art. The control network 101 comprises a main data bus controller 103 which is connected over a main data bus 104 to a plurality of first-tier slave nodes 109 and 123. One first-tier slave node 123 connected to the main data bus 104 also functions as a second data bus controller, and is connected to a second data bus 113. The second data bus controller 123 is connected over the second data bus 113 to a plurality of second-tier slave nodes 130. The main data bus 104 forms a high-speed, bi-directional communication link between the main data bus controller 103 and the first-tier slave nodes 109 and 123, and the second data bus 113 forms a low-speed, bi-directional communication link between the second data bus controller 123 and the second-tier slave nodes 130.

The nature of the slave nodes 109, 123 and 130 depends in part on the control application for which they are deployed. In a transit vehicle or railcar, for example, the master data bus controller 103 and the slave nodes 109, 123 and 130 may each be assigned to control a particular section of the vehicle or railcar, or may be assigned to control particular input and output functions. For each slave node 109, 123 and 130 in FIG. 1, various control signals are shown connected to the nodes such as to illustrate one exemplary arrangement of control functionality.

In operation, the main controller 103 communicates with the first-tier slave nodes 109 and 123 using the main data bus 104 as a high speed bi-direction link. An exemplary baud rate for communications over the main data bus 104 is 256 k. The main data bus controller 103 is generally responsible for delegating control commands to the first-tier slave nodes 109 and 123, and for responding to status information and events communicated to the main data bus controller 103 over the main data bus 104. Each of the first-tier slave nodes 109 and 123 receives commands from the main data bus controller 103, and issues appropriate commands over their respective control lines. In a similar manner, the second data bus controller 123 communicates with the second-tier slave nodes 130 using the second data bus 113 as a low speed bi-direction link (having a baud rate of, e.g., 9.6 k), and instructs the second-tier slave nodes 130 to carry out certain control functions, or responds to status messages or events relayed to the second data bus controller 123 from the second-tier slave nodes 130.

Figure 2:
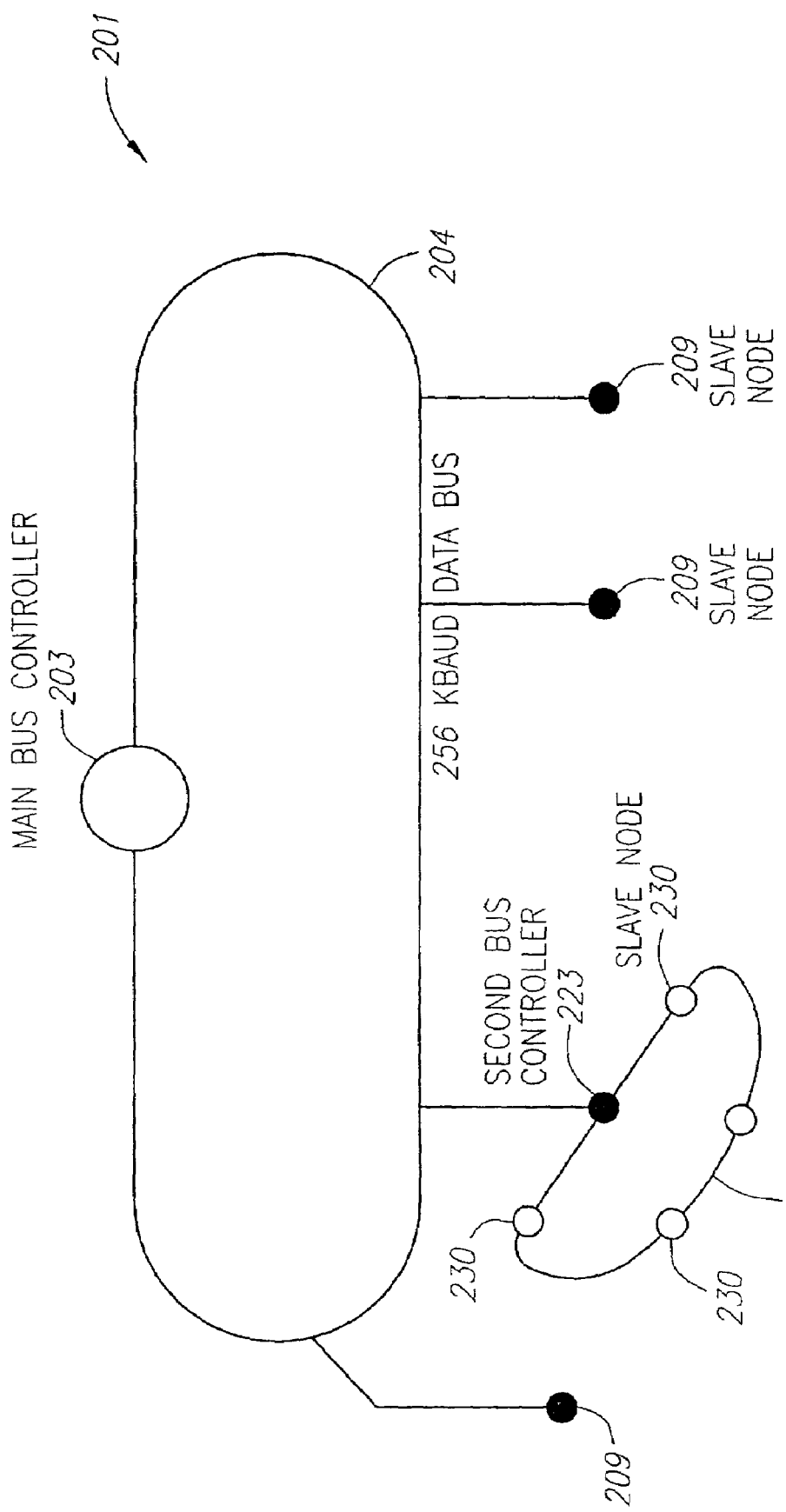
FIG. 2 is another diagram of a distributed control network having a two data buses each configured in a loop configuration as known in the prior art.

FIG. 2 is a diagram showing the layout or architecture of the FIG. 1 control network. The control network 201 shown in FIG. 2 comprises a main data bus controller 203 which is connected to a main data bus 204. The main data bus 204 is physically connected to a plurality of first-tier slave nodes 209 and 223. As explained with respect to the control network 101 shown in the FIG. 1, one of the first-tier slave nodes 223 also functions as a second data bus controller 223, and is connected over a second data bus 213 to a plurality of second-tier slave nodes 230. The main data bus 204 is configured in a loop such that it passes through each of the first-tier slave nodes 209 and 230 and returns to rejoin the main data bus controller 203. In this way, should the wires of the main bus 204 become severed, the main data bus controller 203 will still be connected to the first-tier slave nodes 209 and 223 and will not necessarily lose control over the system. Similarly, the second data bus 213 is configured in a loop such that it passes through each of the second-tier slave nodes 230 and returns to rejoin the second data bus controller 223, thereby providing an architecture resilient to potential severing of the wires of the second data bus 113. Each of the main data bus controller 203, first-tier slave nodes 209 and 223, and second-tier slave nodes 230 may be connected to a plurality of control signals for performing control or sensor functions, or various other input and output functions as necessary for the particular control application.

The control network 201 shown in FIG. 2 thus utilizes a dual-bus architecture to perform control functions. Because of the hierarchical architecture of the control system 201, relatively low baud rates on the second data bus 213 can be tolerated, leading to reduced system size, cost and complexity over traditional non-hierarchical, relay-based systems. The slower speed on the secondary data bus 213 also reduces the system's susceptibility to electromagnetic interference, a potential problem in certain control system environments (such as railcars).

Figure 3:
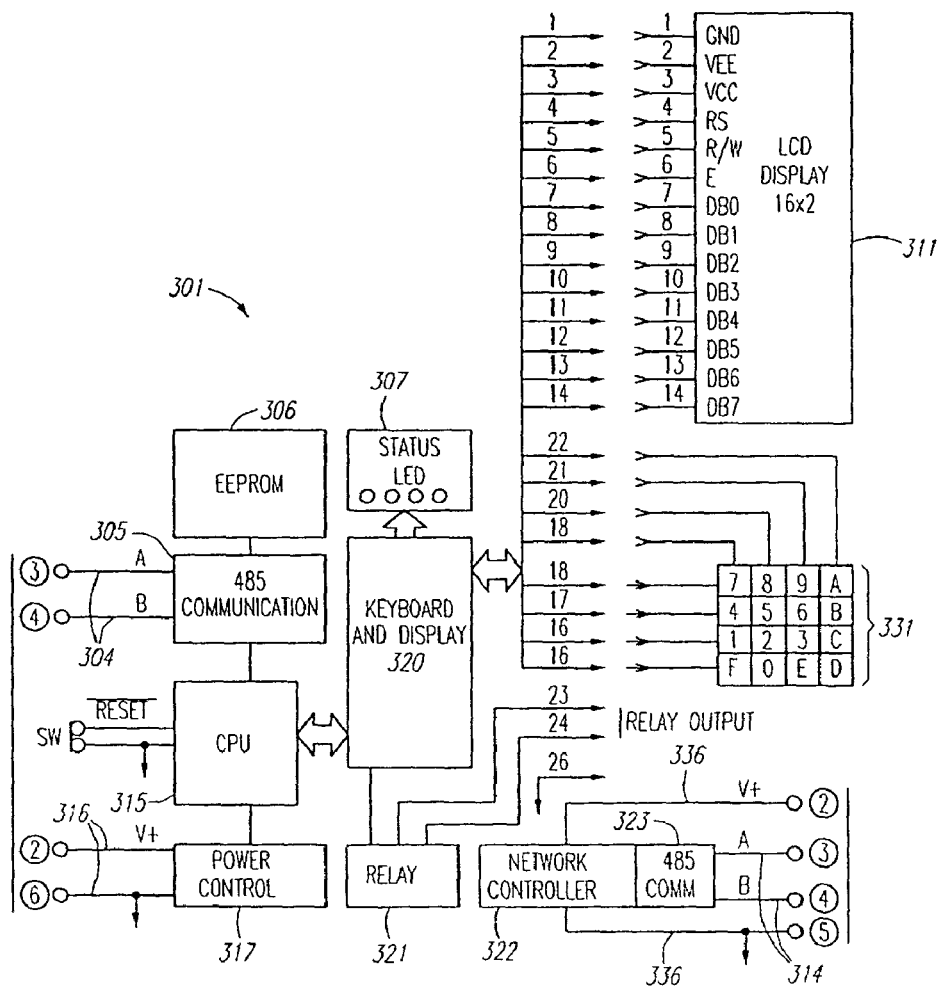
FIG. 3 is a circuit block diagram of a node that may be employed in the distributed control network of FIG. 1 or FIG. 2.

Each node, whether master data bus controller 203, first-tier slave node 209 or 223, or second-tier slave node 230, includes means for performing computations necessary for its functionality, and is configured with components such as a central processing unit (CPU) and memory. FIG. 3 is a more detailed block diagram of a node 301 (such as the master data bus controller 203, a first-tier slave node 209 or 223, or a second-tier slave node 230) that may be employed in the control network of FIG. 2. The node 301 comprises a CPU 315 connected to a power control block 317 and a transceiver 305. The node 301 is also connected to power signal lines 316, which connect to the power control block 317. The node 301 may communicate over communication signal lines 304, which are connected to the transceiver 305. An electrical erasable programmable read-only memory (EEPROM) 306 stores programming information utilized by the CPU 315 for carrying out certain programmable functions. The CPU 315 has access to a random access memory (RAM) (not shown) and read-only memory (ROM) (not shown) as needed for the particular application.

The CPU 315 is connected to a keyboard and display interface block 320. The keyboard and display interface block 320 is connected to status LEDs 307, relays 321, and LED display 311 and a keypad 331. The node 301 is thereby can accept manual inputs (e.g., from the keypad 331) or receive sensor inputs (e.g., over relays 321), and can display operational status using status LEDs 301 or LCD display 311.

The node 301 further comprises a network controller 322 which preferably comprises a second CPU. The network controller 322 is connected to a second transceiver 323 which is connected to a second pair of communication signal lines 314. The network controller also outputs power signal lines 336.

In operation, node 301 may communicate over two different data buses using transceivers 305 and 323. Thus, node 301 may communicate over a first data bus (such as data bus 204 shown in FIG. 1) by receiving and transmitting signals over communication signal lines 314 using transceiver 323, under control of the network controller 322. The node 301 may communicate over a second data bus (such as data bus 213 shown in FIG. 2) by transmitting and receiving signals over communication signal lines 304 using transceiver 305, under control of CPU 315. The CPU 315 and network controller 322 may transfer information back and forth using a shared memory (not shown). The node 301 may serve as both a "slave" unit with respect to the first data bus 204 and a "master" unit with respect to the second data bus 213. By interconnecting a plurality of nodes 301 in an appropriate configuration, a hierarchical control network with two data buses (as shown in FIG. 2) may be established.

Figure 4:
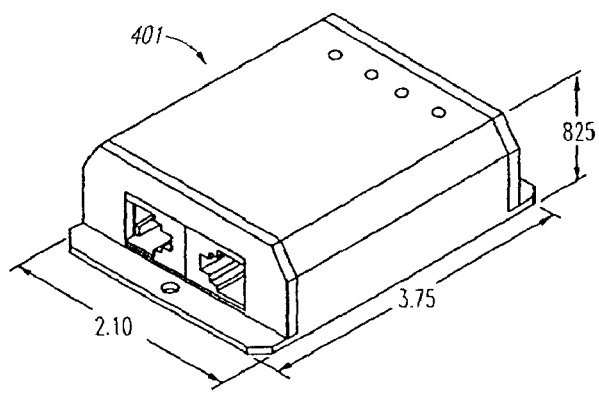
FIG. 4 is a diagram showing a physical encasement of the node shown in FIG. 3.

Each node 301 such as shown in FIG. 3 is housed in a rugged, potted case made of a suitable lightweight material such as aluminum that provides environmental protection and allows for heat dissipation. FIG. 4 is a diagram showing an exemplary physical casing 401 of a module or node 301 such as shown in FIG. 3. The casing 401 can be quite small; in the example of FIG. 4, the casing 401 measures approximately 2.1" by 3.75", and is 0.825" in thickness.

A problem that can occur in operation of a control network such as shown in FIG. 2 is that if the master data bus controller 203 fails then operation of the entire system could be jeopardized. A possible solution would be to provide a redundant master data bus controller that has the same functionality as the primary master data bus controller 203 in all respects. Upon detecting a failure of the primary master data bus controller 203, the backup master data bus controller could shut down the primary master data bus controller 203 and take over control of the network.

While having such a separate, redundant master data bus controller for backup purposes may provide a solution where the primary master data bus controller 203 fails, it falls short of being a complete solution. As an entirely separate controller having complete functional and hardware redundancy of the primary master data bus controller 203, incorporation of the backup master data bus controller effectively doubles the cost of implementing the master data bus controller 203. Also, another drawback is that if both the master data bus controller 203 the backup master data bus controller fail, then operation of the entire system would be jeopardized and operation could come to complete halt.

In addition to the possibility of the master data bus controller 203 failing, the second data bus controller 223 could also be subject to failure. While a redundant second data bus controller for backup purposes could be provided, the cost of implementing the second data bus controller would be essentially doubled, and the system is still subject to potentially complete failure should the second data bus controller also fail. Moreover, adding redundant data bus controllers could complicate the wiring of the system.

A preferred embodiment of the invention overcomes one or more of the above problems by providing redundant backup control for the master data bus controller 203 or other type of master node, the second data bus controller 223 or similar types of nodes, and, if further nested control levels exist (as described, for example, in later embodiments herein), other sub-controllers for those control levels.

Figure 5:
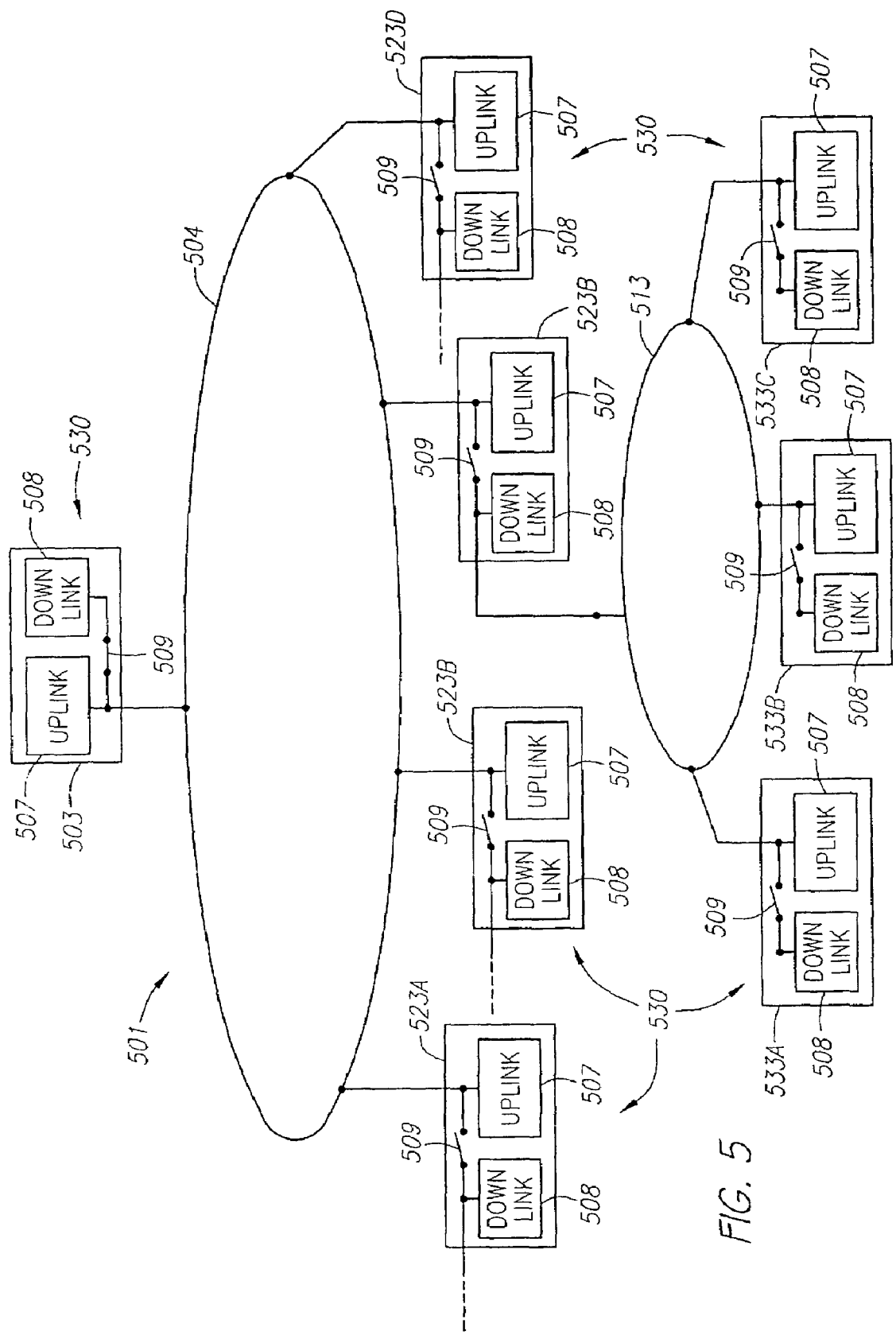
FIG. 5 is a block diagram of a preferred control network architecture in accordance with one or more aspects of the present invention.

FIG. 5 is a block diagram of a preferred embodiment of a control network 501 having redundant backup control capability for a master node at each bus level of the control network 501. Hereinafter, the node acting as the master bus controller for a particular bus will be referred to as the "master node" for that particular bus, and all the other nodes on that bus will be referred to as "slave nodes" for that particular bus. In the control network shown in FIG. 5, a master node 503 and a plurality of first-tier slave nodes 523 are connected to a main data bus 504. In a preferred embodiment of the invention, each of the slave nodes 523 is configured or can be configured to control a secondary data bus. For example, the first-tier slave node 523c is shown connected to a secondary data bus 523 in the control network 501. The first-tier slave node 523c functions as a second-tier master node with respect to second-tier slave nodes 533 connected to the secondary data bus 513. Others of the first-tier slave nodes 523 can also serve as second-tier master nodes and be connected to different secondary buses having additional second-tier slave nodes. A multi-level or multi-tiered hierarchical control network is thereby established.

Each of the master node 503, first-tier slave nodes 523, second-tier slave nodes 533, and other lower-level slave nodes (not shown in FIG. 5) are referred to hereinafter generically as "nodes" and are designated as nodes 530 in FIG. 5. In one aspect of a preferred embodiment as shown in FIG. 5, each of the nodes 530 has substantially the same hardware configuration and can therefore function as either a master node or a slave node, depending upon how the control network 501 is configured. Each data bus, along with the nodes attached to it, are generally referred to as a cell, and the master node connected to the data bus is referred to as a "cell controller" for that particular cell. As explained in more detail hereinafter, each node 530 configured as a master node transmits and receives messages over the data bus for the cell it controls. Each node 530 configured as a slave node remains in a listen mode, receiving but not transmitting messages over that data bus, unless specifically requested to transmit information over the data bus by the master node. Any number of the slave nodes can, even though operating as a slave node with respect to an upper tier, be simultaneously operating as a master node with respect to other lower-tier slave nodes at a different cell sub-level.

A preferred embodiment of the invention, as noted, comprises a mechanism for redundant backup control of any node functioning as a master node at any level or sub-level of the control network 501. As generally described, in operation of a preferred embodiment of the invention the slave nodes connected to a particular data bus monitor the data bus while in a listen mode and await periodic signals from the master node for that data bus. Upon a failure to receive a signal from a master node within an expected time, the slave nodes connected to that data bus begin a wait period (which is preferably a different wait period for each slave node connected to the data bus). When the wait period elapses, the slave node determines that a failure in the master node for the particular data bus has occurred, and takes steps to take over the functionality of the master node. Each of the slave nodes is programmed with a different wait period, so that there is no contention for replacing the master node when a master node failure has occurred. In one aspect, backup control of each master node is prioritized, such that there is a specific order in which the slave nodes can potentially take over control of the master node functionality when a failure has occurred.

In more detail, again with reference to FIG. 5, one of the nodes 530 attached to the main data bus 504 is configured as a master node 503. The other nodes 530 attached to the main data bus 504 (in this example numbering four such nodes 530) are configured as first-tier slave nodes 523, meaning that they receive but do not transmit master-control signals over the main data bus 504. The first-tier slave nodes 523 may, however, from time to time send responsive signals or status signals over the main data bus 504.

In a preferred embodiment, each of the first-tier slave nodes 523 may be configured as a second-tier master node controlling a secondary bus. One such example is shown in FIG. 5, wherein first-tier slave node 523c is connected to a secondary data bus 513. A plurality of other nodes 530 are also attached to the secondary bus data 513, and serve as second-tier slave nodes 533. There are three such second-tier slave nodes 533 in the example shown in FIG. 5. With respect to the secondary data bus 513, the first-tier slave/second-tier master node 523c transmits master-control signals to the second-tier slave nodes 533. The second-tier slave nodes 533 ordinarily operate only in a listen mode, but from time to time may send responsive messages or status messages to the second-tier master node 523c. The other first-tier slave nodes 523a, 523b and 523d may similarly be connected as second-tier master nodes (i.e., cell controllers) each controlling its own secondary bus or cell.

While the control network 501 shown in FIG. 5 has four first-tier slave nodes 523 and three second-tier slave nodes 533, the number of first-tier slave nodes 523 and second-tier slave nodes 533 is limited only by the ability of the master node to communicate with the slave nodes over the particular data bus. There may be more slave nodes or fewer slave nodes on each bus than shown in the control network 501. In a preferred embodiment, there are no more than eight such cell controllers, although more than eight may be used so long as processing capacity and speed permit.

Figure 7:
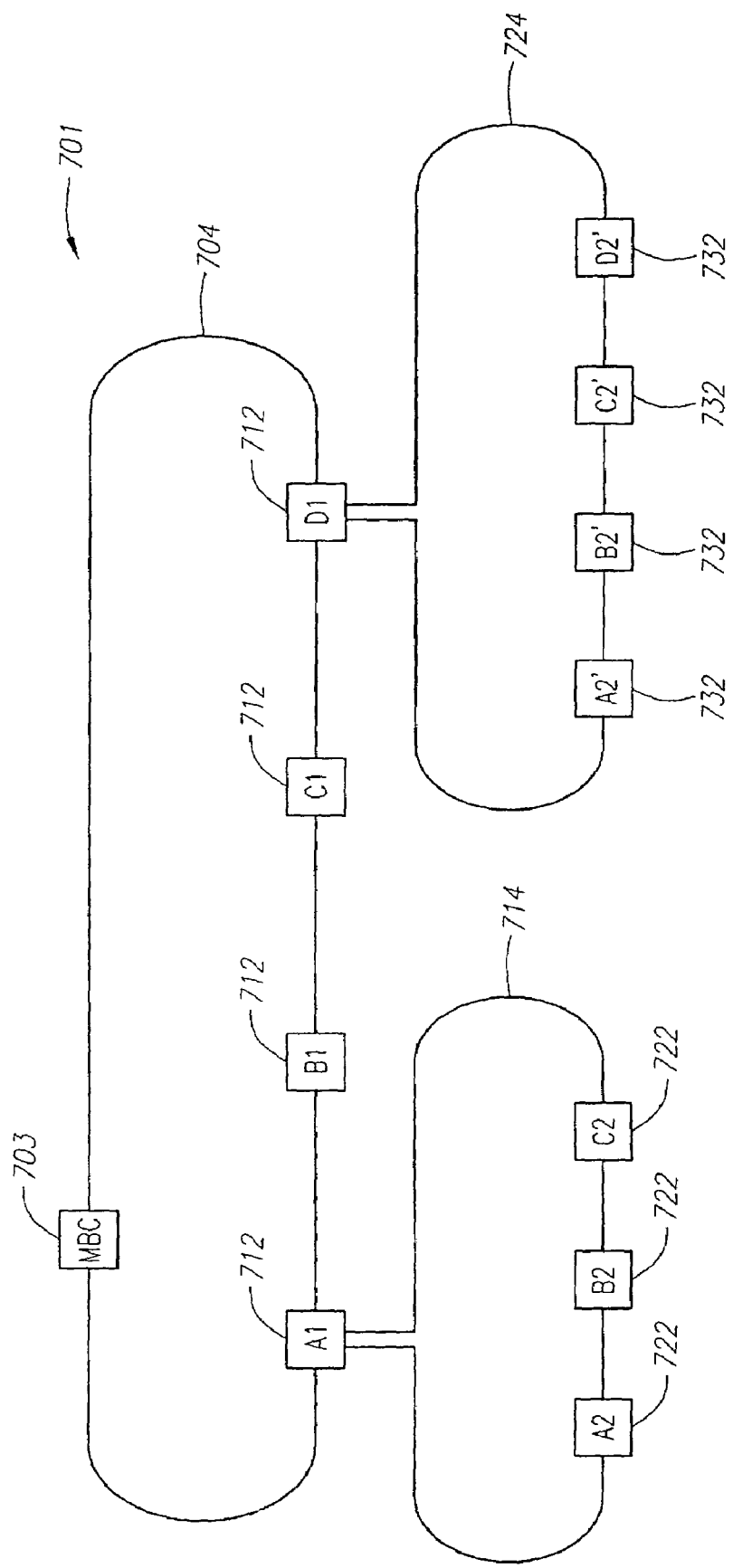
FIG. 7 is a diagram of a hierarchical control network in accordance with one embodiment of the present invention having multiple second-tier buses.
Figure 8:
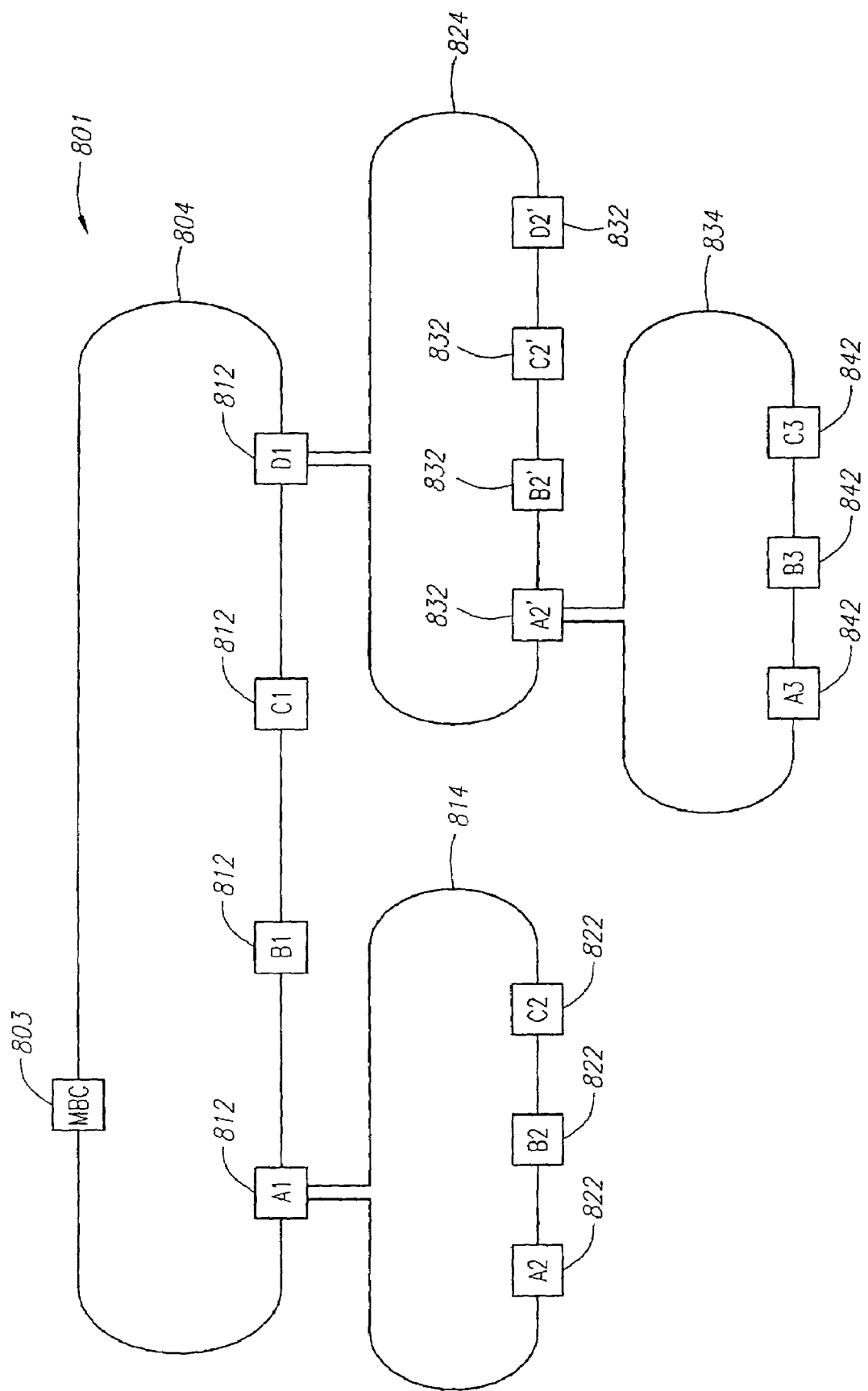
FIG. 8 is a diagram of a hierarchical control network in accordance with another embodiment of the present invention having a third-tier bus.
Figure 9:
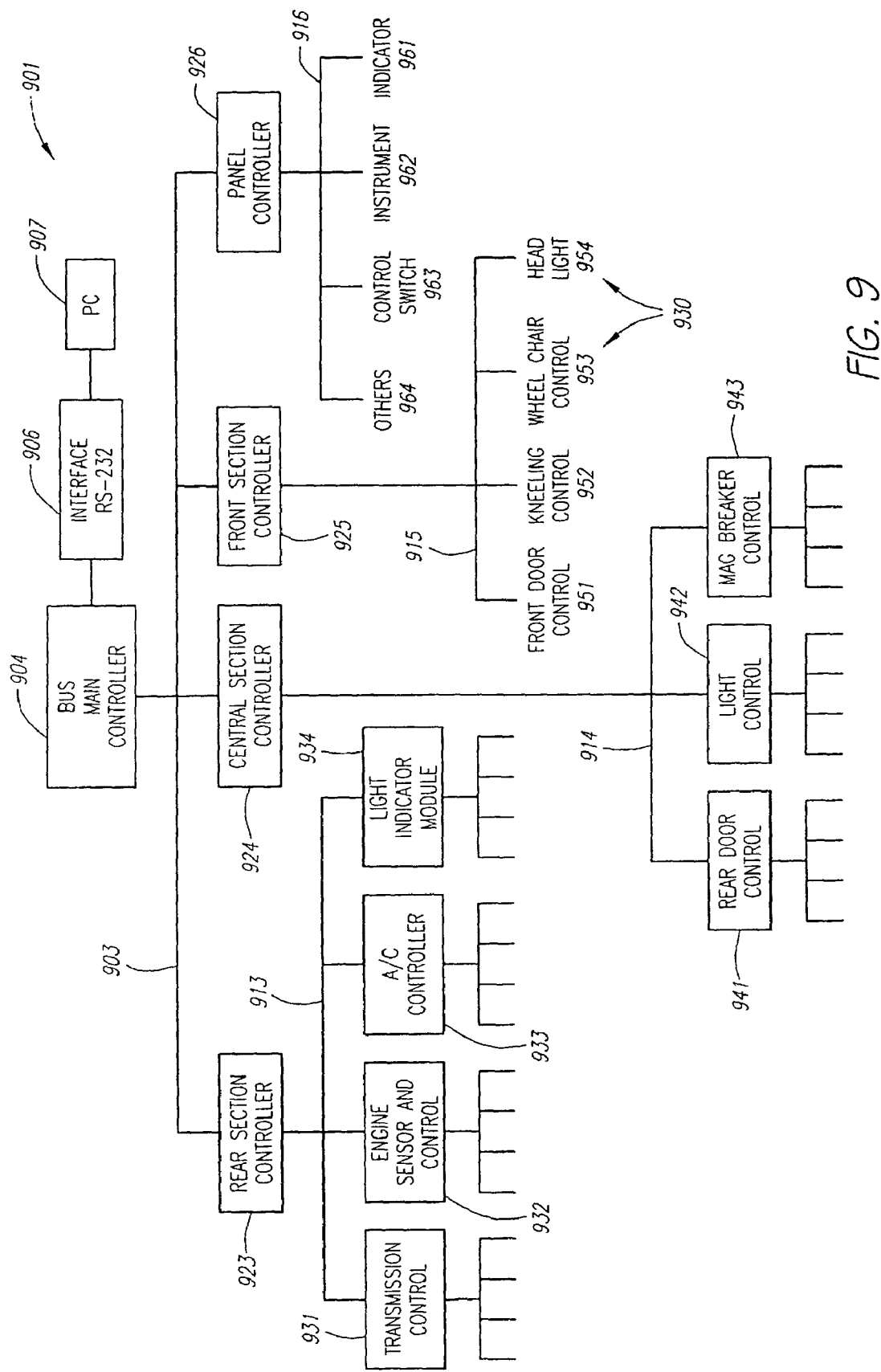
FIG. 9 is a functional diagram of a multi-bus control network illustrating one example of bus architectural layout and node functionality according to one embodiment of the invention.

In addition, further levels of control nesting beyond two data buses may also be provided, using a similar approach to the two data bus method. Thus, for example, one or more of the second-tier slave nodes 533 may be configured as a third-tier master node controlling its own tertiary or third-tier data bus. While FIG. 5 only shows two nested control levels, the same control concepts would apply to a control network architecture having additional nested control levels. Examples of control networks having more than two data buses are depicted in FIGS. 7, 8 and 9 and described in more detail hereinafter.

In a preferred embodiment, communication over the main data bus 504 and the secondary data bus 513 (or buses, if appropriate) is time-multiplexed such that only one node 530 is transmitting over a particular data bus at a given time. Usually, each transmitted message will be targeted for a specific destination node 530, which may be specified by address bits in the transmitted message. However, in some embodiments broadcast messages may also be used targeted to multiple nodes 530.

Responsibilities for tasks, or groups of tasks, may be assigned to specific nodes 530. For example, each of the first-tier slave nodes 223 may be assigned a distinct sphere of responsibility. Similarly, each of the second-tier slave nodes 533 may be assigned a distinct sphere of responsibility. Examples of tasks that may be assigned to different nodes 530 are described for an exemplary control network later herein, with respect to FIG. 9.

Each of the nodes 530 preferably comprises an uplink transceiver 507, a downlink transceiver 508, and a switch 509. Each of the nodes 530 receives signals over its downlink transceiver 508. Over the main data bus 504, the first-tier master node 503 transmits master-control signals to each of the first-tier slave nodes 523. From time to time, according to the programmed control protocol, the first-tier slave nodes 523 respond to the master-control signals, or otherwise send status messages to the first-tier master node 503 when events occur specific to that first-tier slave node 523. Otherwise, the first-tier slave nodes 523 do not ordinarily communicate with each other.

In a similar manner, over each secondary data bus (such as secondary data bus 513), the second-tier master node 523 (for example, first-tier slave/second-tier master node 523c in FIG. 5) transmits master-control signals to each of the second-tier slave nodes 533 connected to the same secondary data bus. From time to time, according to the programmed control protocol, the second-tier slave nodes 533 respond to the master-control signals, or otherwise send status messages to the second-tier master node 523c when events occur specific to that second-tier slave node 533. Otherwise, the second-tier slave nodes 523 do not ordinarily communicate with each other.

Communication between nodes is preferably carried out using half-duplex time division multiplexing. In typical operation, the master node polls each of the slave nodes periodically. Each of the nodes is preferably provided with a unique node identification number or address that distinguishes it from all other nodes of the control network. The master node sends a control message to each slave unit in turn, using the node identification number or address to identify the intended destination. Each of the slave nodes receives the control message but only reacts if it recognizes its own node identification number or address in the control message. The slave node takes the actions requested by the control message received from the master node. Within a designated time period after receiving the control message, the slave node responds to the master node with an acknowledgment message. Each of the slave nodes are polled in turn so that the master node can keep track of events happening throughout the system.

A communication protocol is preferably established so as to avoid collisions on each of the data buses. A simple and effective communication protocol is one in which the master node for the particular data bus sends a control message to a particular slave node, which responds with an acknowledgment or status message within a predetermined amount of time before the master node contacts another slave node. Slave nodes generally do not initiate communication without being first polled by the master node. The master node may also send out a broadcast control message that is intended for receipt by more than one of the slave nodes. The broadcast control message can comprise a node identification number or address that instructs a single particular node to respond to the broadcast control message. Usually, the single node selected for response will be the most critical node requiring receipt of the broadcast control message.

Failure of the current master node (at any of the control levels) commonly results in the master node either failing to transmit, or else transmitting improper control information to the slave nodes over the data bus. According to a preferred redundant backup control protocol, the slave nodes periodically receive master-control messages from the master node and, in the event that proper master-control messages fail to appear, initiate a failure mode response procedure.

Figure 6:
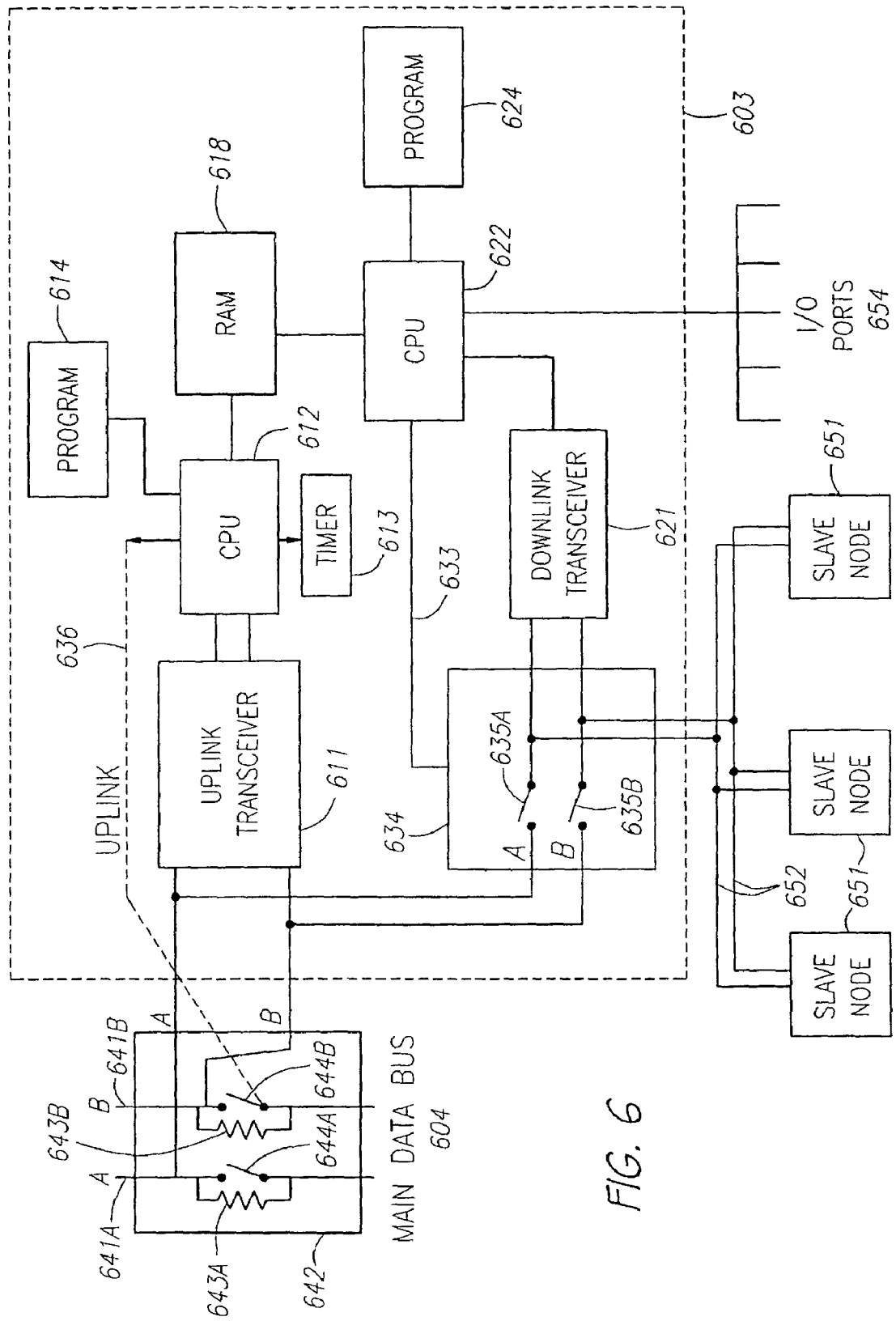
FIG. 6 is a block diagram of a preferred node within the control network architecture shown in FIG. 5.

Detection of and response to a failure mode condition may be explained in greater detail with reference to FIG. 6, which is a block diagram of a preferred embodiment depicting most of the main components of a node (such as any of nodes 530 shown in FIG. 5). Because failure mode detection and response is carried out by a node 530 operating as a slave node, the following discussion will assume that the node 603 shown in FIG. 6 is initially configured as a slave node. Further, for simplicity of explanation, it will be assumed that the node 603 shown in FIG. 6 is a first-tier slave/second-tier master node connected to a main bus and a secondary bus (such as first-tier slave/second-tier master node 523c connected to the main data bus 504 and secondary data bus 513 in FIG. 5), although the same node circuit configuration is preferably used for each of the nodes 530, regardless of control level, for ease of construction and flexibility purposes.

In the node block diagram of FIG. 6, a node 603 is shown connected to a first bus (e.g., main bus) 604. The node 603 comprises an uplink transceiver 611, a downlink transceiver 621, a CPU 612 connected to the uplink transceiver 611, and another CPU 622 connected to the downlink transceiver 621. Both CPUs 612, 622 are preferably connected to a dual-port RAM 618, and each CPU 612, 622 is connected to a ROM program store 614 and 624, respectively. The second CPU 622 is connected through an appropriate interface to I/O ports 654, which may comprise sensor inputs, control signal outputs, status LEDs, LCD display, keypad, or other types of external connections. It will be understood that the node 603 of FIG. 6 can have all the components and functionality of the node 301 shown in FIG. 3; however, in FIG. 6 only certain basic components needed for explaining the operation of the invention are depicted.

Each node 603 is preferably capable of both sending and receiving messages (e.g., control instructions). Typically, the uplink transceiver 611 operates in a "slave" mode whereby the node 603 receives control instructions using the uplink transceiver 611 and then responds thereto, and the downlink transceiver 621 operates in a "master" mode whereby the node 603 issues control instructions (e.g., polls slave nodes) and awaits a response from other nodes after sending such control instructions.

The downlink transceiver 621 of the node 603 is connected to a secondary data bus 652, to which is also connected a plurality of second-tier slave nodes 651 (assuming the node 603 is a first-tier slave/second-tier master node). The node 603 thereby functions as a first-tier slave node with respect to the main data bus 604, receiving with its uplink transceiver 611 first-tier master-control signals over the main bus 604 from a first-tier master node (such as master node 503 shown in FIG. 5), and also functions as a second-tier master node with respect to the secondary data bus 652, transmitting second-tier master-control signals with its downlink transceiver 634 to second-tier slave nodes 651.

The node 603 also comprises a pair of switches 635a, 635b connected between the downlink transceiver 621 and the signal lines 643a, 643b of the main data bus 604. In normal operation, the switches 635a, 635b remain open (unless the node 503 is also the first-tier master node, such as master node 503 shown in FIG. 5, in which case the switches 635a, 635b would be closed), and the downlink transceiver 621 is thereby isolated from the main data bus 604. However, when a first-tier master node failure condition is detected, switches 635a, 635b are closed, enabling the downlink transceiver 621 to take over for the first-tier master node. The downlink transceiver 621 would therefore function simultaneously as master node with respect to both the main data bus 604 and the secondary data bus 652.

In a preferred embodiment, detection of a master node failure condition on the main data bus 604 is accomplished using a timer mechanism, such as a hardware timer 613 accessible (either directly or indirectly) by the CPU 612 that is connected to the uplink transceiver 611. According to a preferred control protocol (assuming the node 603 is a first-tier slave/second-tier master node), the uplink transceiver 611 of node 603 receives first-tier master-control signals periodically from the first-tier master node (such as master node 503 in FIG. 5). The master-control signals may, for example, request status information from the node 603, or instruct the node 603 to carry out certain control or input/output functions. The node 603 ordinarily responds by carrying out the requested functions and/or sending an acknowledgment or status signal to the first-tier master control node using the uplink transceiver 611.

Timer 613 times out a wait period between master-control signals received from the first-tier master control node. In a preferred embodiment, each time the uplink transceiver 611 receives a master-control signal from the first-tier master node that is recognized as an appropriate master-control signal within the particular programmed control protocol (whether or not the master-control signal is directed to the particular node 603), the CPU 612 connected to the uplink transceiver 612 resets the timer 613. If the timer 613 ever times out, then CPU 612 responds by asserting a failure mode response procedure. The timing out of timer 613 may result in an interrupt to CPU 612 in order to inform the CPU 612 of the failure to receive master-control signals, or else the CPU 612 may periodically monitor the timer 613 and, when the CPU 612 notices that the timer 613 has timed out, assert a failure mode response procedure.

When a failure mode condition is detected, the CPU 612 sets a failure mode status bit in a predetermined flag location within the dual-port RAM 618. The other CPU 622 periodically monitors the failure mode status bit in the dual-port RAM 618 and is thereby informed when a failure occurs. Alternatively, instead of the CPUs 612, 622 communicating through the dual-port RAM 618, timer 613 can directly inform CPU 622 when a failure to receive master-control signals has occurred (i.e., when timer 613 has timed out).

When the CPU 622 has been informed or otherwise determined that a failure mode condition exists, and that the first-tier master node has presumably failed, the CPU 622 sends a signal over control line 633 to close switches 635a, 635b, thereby connecting the downlink transceiver 621 to the main bus 604. From that point on, the CPU 622 performs as the first-tier master node with respect to the main bus 604. The node 603 can continue to receive information over the main data bus 604 using the uplink transceiver 611. Alternatively, the node 603 may thereafter perform all transmission and reception over both the main bus 604 and the secondary bus 652 using the downlink transceiver 621. When the failure mode is entered, the CPU 622 may be programmed so as to directly carry out the I/O port functions for which it previously received instructions from the first-tier master node, or the node 603 may send master-control signals to its own uplink transceiver 611 and thereby continue to carry out the I/O port functions as it had previously been doing. In other words, the node 603 can give itself control instructions over the main data bus 604 so that it can continue to perform its previously assigned functions. If, after taking over for the first-tier master node, the node's downlink transceiver 611 should fail, the node 603 can still continue to perform its control functions when the next slave node takes over control as the new first-tier master node (as later described herein), because its uplink transceiver 611 continues to function in a normal manner.

According to the above described technique, the node 603 thereby substitutes itself for the first-tier master node upon the detection of a first-tier master node failure as indicated by the failure to receive the expected first-tier master-control signals. Should the node 603 fail, either before or after taking over control for the first-tier master node, the next first-tier slave node would take over and become the first-tier master node in a similar manner to that described above.

Referring again to FIG. 5, the order in which the first-tier slave nodes 523 take over for the first-tier master node 503 is dictated by the wait period timed out by the timer 613 of the particular first-tier slave node 523. The timer 613 (see FIG. 6) for each first-tier slave node 523 is programmed or reset using a different time-out value. A first-tier slave node 523 only asserts a failure mode condition when its internal timer 613 reaches the particular timeout value programmed for that particular node 523.

While the programmed wait periods for the internal timer 613 in each first-tier slave node 523 can vary depending upon the control application, illustrative wait periods are programmed in ten millisecond increments. Thus, for example, first-tier slave node 523a could be programmed with a 10 millisecond wait period; the next first-tier slave node 523b could be programmed with a 20 millisecond wait period; the next first-tier slave node 523c could be programmed with a 30 millisecond wait period; and the last first-tier slave node 523d could be programmed with a 40 millisecond wait period; and so on. First-tier slave node 523a would take over as the first-tier master node if 10 milliseconds elapses without it receiving any proper first-tier master-control signals; the next first-tier slave node 523b would take over as the first-tier master node if 20 milliseconds elapses without it receiving any proper first-tier master-control signals; the next first-tier slave node 523c would take over as the first-tier master node if 30 milliseconds elapses without it receiving any proper first-tier master-control signals; and so on.

Use of 10 millisecond increments for the wait periods in the above example is considered merely illustrative, and the actual wait periods should be selected depending upon the time criticality of the control messages, and the number of messages that may be missed before a high enough degree of certainty is established that the master node has failed. For example, if a slave node expects to observe a control-message signal on the data bus no later than every 5 milliseconds, then the slave node may be programmed to assert a failure mode condition after a wait period corresponding to the absence of a predefined number of messages—for example, twenty messages (i.e., 100 milliseconds). If critical aspects of the system requiring master node control need to be serviced in a shorter time period, then the wait period would have to be reduced to accommodate the time-sensitive components of the system.

The order in which the slave nodes take over for the master node need not be dictated by the relative position in the control loop of the slave node with respect to the master node, but rather may be dictated according to the programmed wait period in each slave node. Flexibility is thereby provided in the order of priority in which the slave nodes take over for the master node in the event of a failure event.

Accordingly, by use of the inventive techniques described herein, redundant backup for the first-tier master node 503 is provided. Such redundant backup control is provided without requiring additional physical nodes to be located within the control system, and without having to provide wiring for such additional physical nodes to the buses 504 or 513. The redundant backup for the master node 504 is also accomplished while resolving contention problems that might otherwise occur if each of the first-tier slave nodes 523 were programmed with the identical timeout period.

In a preferred embodiment, redundant backup control is provided in a similar manner for the secondary data bus 513, and each additional data bus that may be provided in the system (e.g., in systems such as shown in FIG. 7, 8 or 9). Thus, each of the second-tier slave nodes 533 is preferably configured with the circuitry shown for node 603 in FIG. 6, and each of the second-tier slave nodes 533 can therefore substitute itself for the first-tier slave/second-tier master node 523c if the first-tier slave/second-tier master node 523c fails.

If a particular node is operating as a master node for two buses as a result of a failure of the master node on a higher-tier bus, and the node operating as such fails, then it is possible that two different nodes will take over for the failed node, one node taking over on each bus. For example, supposing that first-tier slave/second-tier master node 523c has already taken over as the first-tier master node due to a failure of the master node 503, and further suppose that first-tier slave/second-tier master node 523c too fails, then the next first-tier slave node 523d would take over as the first-tier master node with respect to the main data bus 504, but the first second-tier slave node 533a would take over as second-tier master node with respect to the secondary data bus 513.

In the above manner, despite the failure of one or more nodes, substantial functionality of the control system as a whole can be maintained. A failed node is essentially discarded or bypassed to the extent possible so as to maintain the highest possible degree of continued operability. Furthermore, because certain parts of the system will continue operate despite the failure of the master node, identification of the failed node by engineers or maintenance personnel should be simplified by being able to identify the inoperative portion of the system that has become isolated due to the failure.

In one aspect, separation of responsibility in each node 603 of master functions and slave functions between two different CPU's each operating with a different transceiver allows the node 603 to potentially continue operating as either a master node or a slave node should one of the CPU's fail, providing that the failure does not disrupt both of the transceivers at the node 603.

In a preferred embodiment, the nodes 530 of FIG. 5 are wired using a single cable connecting all of the nodes 530 in a loop configuration. Details of such a wiring technique are described in U.S. Pat. No. 5,907,486 entitled "Wiring Method and Apparatus for Distributed Control Network," assigned to the assignee of the present invention, and previously incorporated herein by reference.

In a preferred embodiment, the nodes 530 of FIG. 5 are configured with fault isolation and recovery circuitry in the case of a short circuit or similar event. Details of such fault isolation and recovery circuitry are described in copending U.S. application Ser. No. 08/853,893 entitled "Fault Isolation and Recovery In A Distributed Control Network," previously incorporated herein by reference.

FIGS. 7, 8 and 9 depicts various embodiments having more than two data buses, so as to provide additional levels of control beyond that afforded by a dual-bus architecture. Each of the nodes shown in FIGS. 7, 8 and 9 is preferably configured to include the circuitry shown for preferred node 603 in FIG. 6. FIG. 7 shows an example of a system architecture for a control network having three data buses 704, 714 and 724. A first-tier master node 703 and a plurality of first-tier slave nodes 712 are connected to the main data bus 704. One of the first-tier slave nodes 712, designated as A1 in FIG. 7, operates as a second-tier master node, and is connected to the second data bus 714 along with a plurality of second-tier slave nodes 722. Another of the first-tier slave nodes 712, designated as D1 in FIG. 7, operates as another second-tier master node, and is connected to the third data bus 724 along with another plurality of second-tier slave nodes 732. The other first-tier slave nodes 712, designated B1 and C1 in FIG. 7, could also be configured as master nodes of a second-tier bus. FIG. 7 thereby provides a hierarchical control network 701 having two control levels or tiers, and three data buses.

FIG. 8 shows an example of a system architecture for a control network having four buses 804, 814, 824 and 834. In a similar manner to FIG. 7, a first-tier master node 803 and a plurality of first-tier slave nodes 812 are connected to the main data bus 804. One of the first-tier slave nodes 812, designated as A1 in FIG. 8, operates as a second-tier master node, and is connected to the second data bus 814 along with a plurality of second-tier slave nodes 822. Another of the first-tier slave nodes 812, designated as D1 in FIG. 8, operates as another second-tier master node, and is connected to the third data bus 824 along with another plurality of second-tier slave nodes 832. One of the second-tier slave nodes 832 connected to the third data bus 824, denoted as A2' in FIG. 8, operates as a third-tier master node with respect to the fourth data bus 834, which is connected to a plurality of third-tier slave nodes 842. FIG. 8 thereby provides a hierarchical control network 801 having three control levels or tiers, and four data buses.

It will be appreciated that, expanding the approach used in FIGS. 7 and 8, additional control levels may be created by adding successive lower control tiers, or additional slave nodes at any particular tier may be configured as cell controllers to control additional localized data buses. A great deal of flexibility is thereby provided in establishing a hierarchical control structure suitable for many different control applications.

FIG. 9 is a diagram showing, from a functional standpoint, an example of a particular control application having multiple data buses in accordance with the hierarchical control principles discussed herein. In FIG. 9, a control network 901 comprises a master node 904 which is connected to a plurality of slave nodes 923, 924, 925 and 926, each of which is assigned a particular sphere of responsibility within the control network. A main bus 903 forms a communication link between the master node 904 and the slave nodes 923, 924, 925 and 926.

Generally, the nature of the slave nodes 923, 924, 925 and 926 depends in part on the control application in which they are deployed. In the example of FIG. 9, the slave nodes 923, 924, 925 and 926 are deployed in a vehicle or railcar, and so the slave nodes 923, 924, 925 and 926 have functionality suited for such a control application. For example, the slave nodes include a slave node 923 operating as a rear section controller, a slave node 924 operating as a central section controller, a slave node 925 operating as a front section controller, and a slave node 926 operating as a panel controller. There may also be additional slave nodes if required.

Each of slave nodes 923, 924, 925 and 926 are considered first-tier slave nodes in the illustrative embodiment shown in FIG. 9. In the control network 901 of FIG. 9, two of the first-tier slave nodes 923, 924 also act as second-tier master nodes for additional data buses. Thus, first-tier slave node 923 operates as a second-tier master node with respect to a second data bus 913, and first-tier slave node 924 operates as a second-tier master node with respect to a third data bus 914. First-tier slave/second-tier master node 923 is connected to a plurality of second-tier slave nodes 931, 932, 933 and 934, which may each be assigned a sub-sphere of responsibility in the cell controlled by the rear section controller. The second-tier slave nodes may therefore include, for example, a slave node 931 operating as a transmission controller, a slave node 932 operating as an engine sensor and controller, a slave node 933 operating as an air conditioner controller, and a slave node 934 operating as a light indicator controller.

Similarly, first-tier slave/second-tier master node 924 is connected to another plurality of second-tier slave nodes 941, 942 and 943, each of which may be assigned a sub-sphere of responsibility in the cell controlled by the central section controller. The second-tier slave nodes may therefore include, for example, a slave node 941 operating as a rear door controller, a slave node 942 operating as a light controller, and a slave node 943 operating as a magnetic breaker controller.

Each of the first-tier slave nodes 923, 924, 925 and 926 (even if operating as a second-tier master node) may be connected to one or more input/output modules 930. For example, the slave node 925 operating as a front section controller may be connected to a front door control module 951, a kneeling mechanism control module 952, a wheel chair platform control module 953, and a headlight output module 954. Likewise, the slave node 926 operating as a panel controller may be connected to an indicator module 961, an instrument module 962, a control switch module 963, and other miscellaneous modules 964. Virtually any type of input/output or control function may represented as a module 930. In each instance, the respective slave node 923, 924, 925 and 926 controls the input/output modules 930 connected to it.

The master node 904 may be connected to a computer 907 through an interface 906 (such as an RS-232 interface), if desired. Through the computer 907, the master node 904 can be instructed to execute certain functions or enter certain control modes. Also, the master node 904 can be monitored or reprogrammed through the computer 907.

In operation, the master node 904 communicates with the cell controllers 923, 924, 925 and 926 using the main bus 903. The master node 904, as previously described, is generally responsible for delegating control commands to the slave nodes 923, 924, 925 and 926, and for responding to status information and events communicated to the master node 904 over the main bus 903. Each of the slave nodes 923, 924, 925 and 926 receives commands from the master node 904, and issues appropriate commands to their respective second-tier slave nodes 931-934 or 941-943, or input/output modules 930.

Generally, the slave nodes are disposed in physical locations near the mechanisms which they control. The main data bus 904 and secondary data buses 913, 914 each form a loop connecting the various nodes connected to the bus in a continuous fashion. The data buses 904, 913 and 914 are not restricted to any particular baud rate. Rather, communication may be carried out over each data bus 904, 913 and 914 at a rate that is suitable for the particular control application. Moreover, there is no particular requirement that the data buses in the FIG. 9 control network (or the more generalized control networks shown in FIGS. 7 and 8) be serial data buses. Rather, the data buses may be parallel data buses in situations, for example, where a high data bandwidth is required.

In the particular control application relating to FIG. 9, each of the nodes is preferably housed in a rugged, potted case made of a suitable lightweight material such as aluminum that provides environmental protection and allows for heat dissipation, as previously described with respect to FIG. 4. In other control environments, other types of housings may be used.

Figure 10:
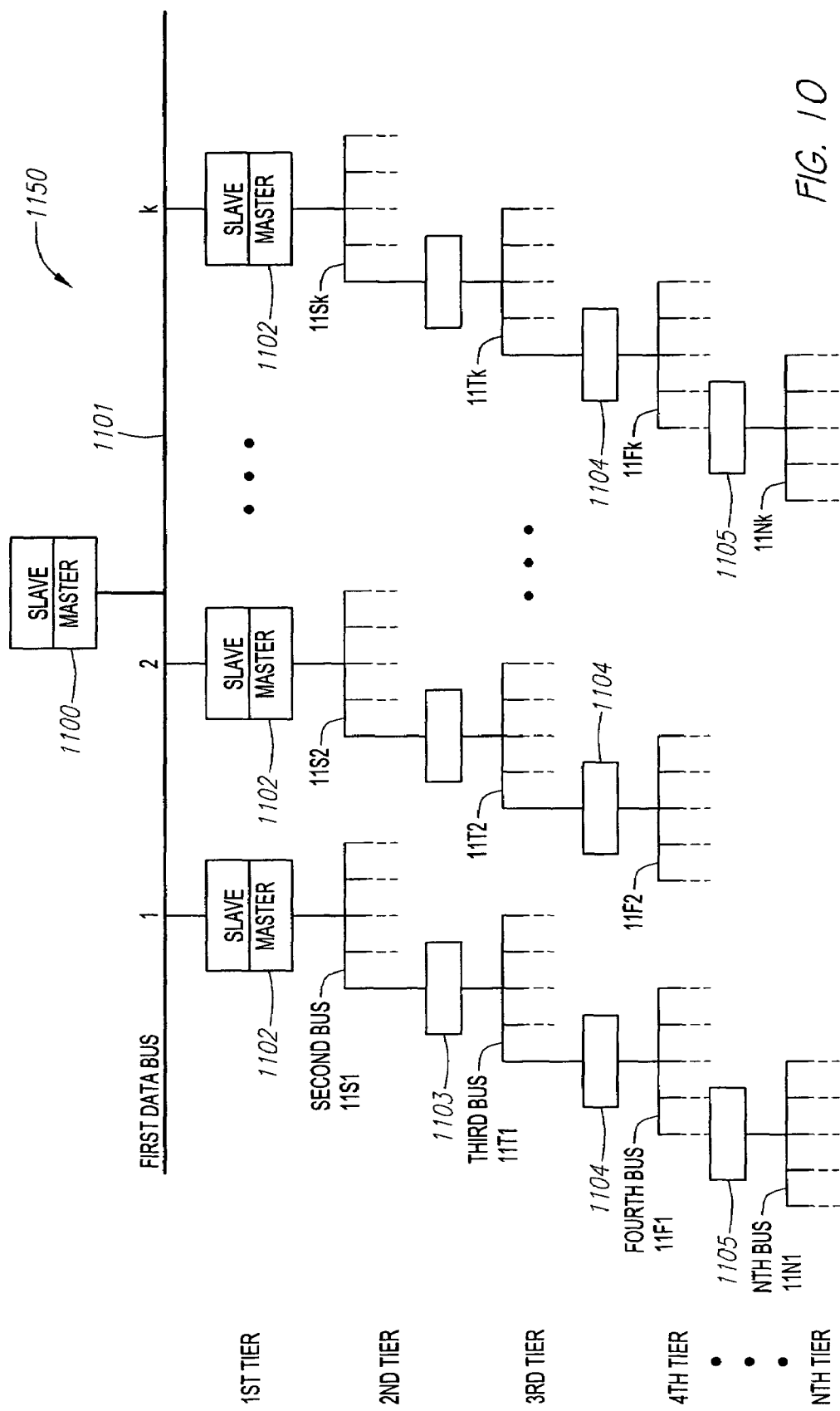
FIG. 10 is a diagram of a hierarchical control network extrapolated to N tiers.

FIG. 10 is a diagram of a hierarchical control network 1150 utilizing the similar principles as described with respect to the embodiments shown in FIGS. 7, 8 and 9, for example, but extrapolated to N tiers. As illustrated in FIG. 10, a first-tier master node 1100 and a plurality of first-tier slave nodes 1102 are connected to the main data bus 1101. Each of the first-tier slave nodes 1102 (up to, e.g., k nodes) may operate as a second-tier master node with respect to a respective second-tier data bus (denoted 11S1, 11S2 . . . 11Sk in FIG. 10), each of which has connected to it a plurality of second-tier slave nodes 1103. Likewise, each of second-tier slave nodes 1103 may be connected to a respective third-tier data bus (denoted 11T1, 11T2 . . . 11Tk in FIG. 10), each of which has connected to it a plurality of third-tier slave nodes 1104. This same expansion may occur at lower tier levels, with respect to fourth-tier data buses (denoted 11F1, 11F2 . . . 11Fk in FIG. 10) down to the Nth level. The control network 1150 depicted in FIG. 10 thereby provides a multiple-bus hierarchical control scheme, with each node preferably capable of fanning out to a number of lower-level slave nodes, which may be repeated down to an arbitrary number of levels or tiers.

In a preferred embodiment, each node in FIG. 10 is given a unique node identifier to facilitate communication among the various nodes in the network. The unique node identifier may comprise, for example, a series of three binary numbers XYZ, the first number X identifying the tier for which the node is connected in its capacity as a slave, the second number Y identifying which bus of the tier (i.e., tier X) the node is attached to by identifying the relative position of the bus with respect to the other buses attached to the tier, and the third number Z identifying the relative position of the node with respect to other nodes attached to the same bus (i.e., bus Y of tier X).

While the control network architecture depicted in FIG. 10 has the advantage of being relatively easily expandable and is capable of controlling very large networks, a potential drawback is that the first-tier master node 1100 may have a difficulty in communicating with some of the lowest tier nodes, or an undesirable time lag or latency may occur due to the need to propagate important communications from lower tier nodes through a number of intermediary nodes up to the first-tier master node 1100. Another potential drawback is that a failure of one of the intermediate nodes acting as a master node with respect to slave nodes underneath it is that a failure of such an acting master node may prevent the slave nodes underneath it from communicating with the first-tier master node.

Accordingly, to overcome one of more of these potential drawbacks, in a preferred embodiment a supervisory network is added to the hierarchical control network and connected to one or more of the lower-tier buses, so as to allow monitoring of communications at the lower tier levels, and to further allow the possibility of redundant backup control and/or communication with respect to the lower-tier master nodes.

Figure 11:
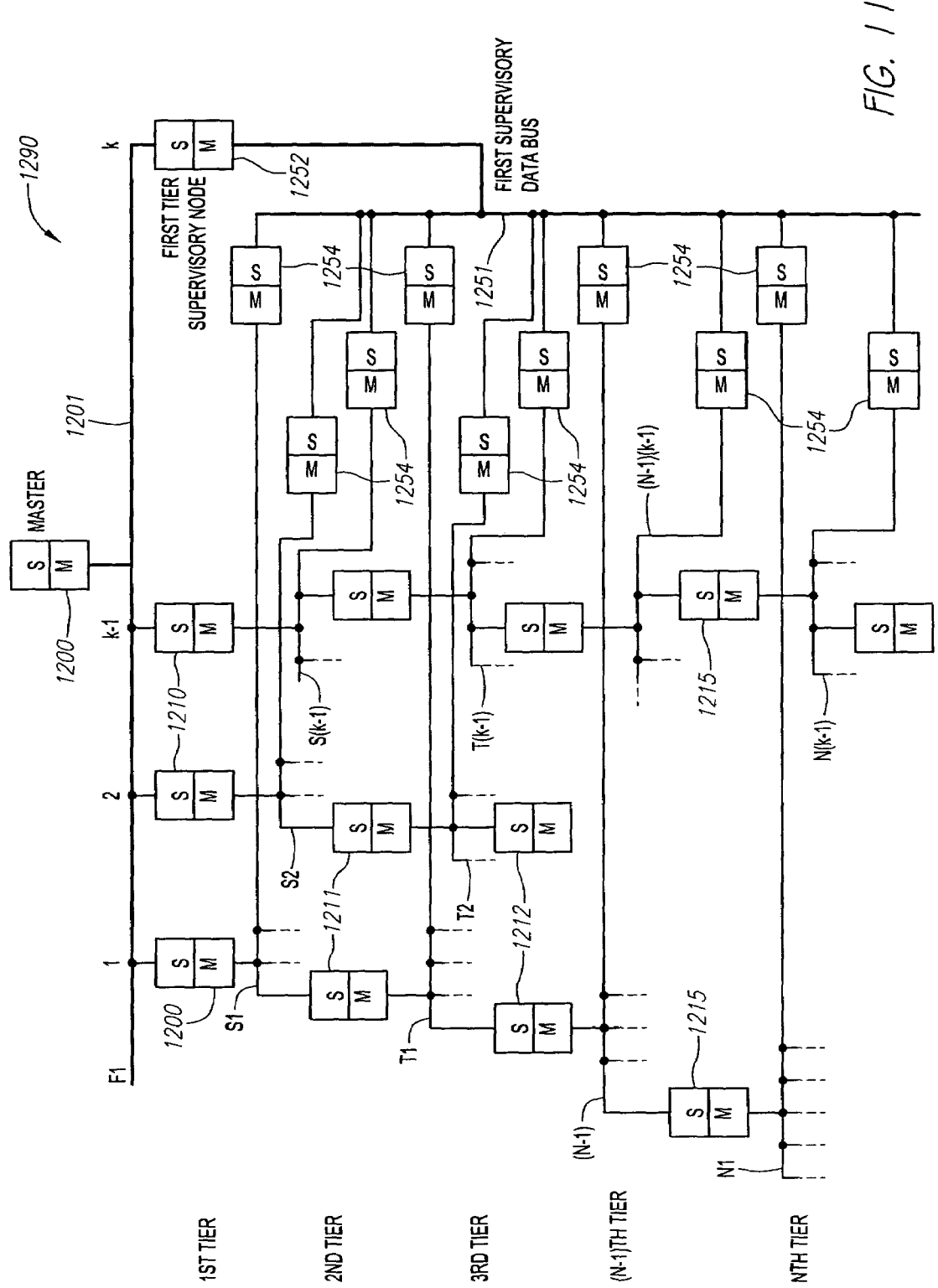
FIG. 11 is a diagram of a hierarchical control network with a matrix architecture according to an embodiment of the invention, so as to provide supervision of mid- and lower-tier levels of the control network.

FIG. 11 is a diagram depicting an example of a matrix control network 1290 including a hierarchical control network (generalized to N levels or tiers, as in FIG. 10) with an added supervisory network according to a preferred embodiment as described herein. As illustrated in FIG. 11, the supervisory network comprises a first-tier supervisory master node 1252 connected to a common supervisory data bus 1251. A plurality of supervisory slave nodes 1254 are connected to the supervisory data bus 1251. Each of the supervisory slave nodes 1254 is also connected to one of the lower-tier buses, as illustrated in FIG. 11, and each of the supervisory slave nodes 1254 monitors communications occurring on the particular lower-tier bus to which it is connected. Information monitored by the supervisory slave nodes 1254 is communicated over the supervisory data bus 1251 to the first-tier supervisory master node 1252 either as needed, or on a regular basis. The first-tier supervisory master node 1252 can relay the information to the first-tier master node 1200 over the first-tier common bus 1201.

In a preferred embodiment, the supervisory master node 1252 and the supervisory slave nodes 1254 each comprise a downlink transceiver and an uplink transceiver, and may be configured, for example, in accordance with the node 603 depicted in FIG. 6. In FIG. 11, the uplink transceiver portion of each node is denoted with an "S" (for Slave), while the downlink transceiver portion of each node is denoted with an "M" (for Master). As illustrated in FIG. 11, the supervisory network may use the same principles and take the same general architecture as the control network shown in FIG. 7 or 8, for example; however, the supervisory network is connected "vertically" so as to connect with one or more lower-tier data buses, thereby allowing interbus monitoring control. The addition of the supervisory network therefore, in one aspect, may be viewed as creating a matrix-type architecture, due to the intersection of control paths emanating downward from a single master node 1200 with the supervisory paths emanating across the control network from a single supervisory master node 1252.

The supervisory network illustrated in FIG. 11, comprising the supervisory data bus 1251 and associated supervisory master node 1252 and supervisory slave nodes 1254, may in one aspect allow rapid communication between different tiers of the hierarchical control network. In the absence of the supervisory network, information from the lowest tiers can only reach a higher-tier master node (e.g., the first-tier master node 1200) by propagating up each tier through a master/slave data exchange at each level, until eventually it reaches the appropriate higher-tier master node. In the case of an emergency, or where time of response by the higher-tier master node is critical, the delay in communicating the information from the lowest tiers to the higher-tier master node can be detrimental. The supervisory network allows information, especially information that is urgent, to reach the higher-tier master node faster than would be possible in the absence of the supervisory network, by bypassing the required master/slave data exchange at each intervening tier.

Not all buses or tiers need to be monitored by the supervisory network. However, it is possible that all of the buses in each tier of the main hierarchical control network (i.e., the control network in the absence of the supervisory network) can be connected to a supervisory node, so as to provide comprehensive supervision and monitoring of all of the buses at each level of the main hierarchical control network. Preferably, only one supervisory node is attached to any given bus in the main hierarchical control network.

Figure 12:
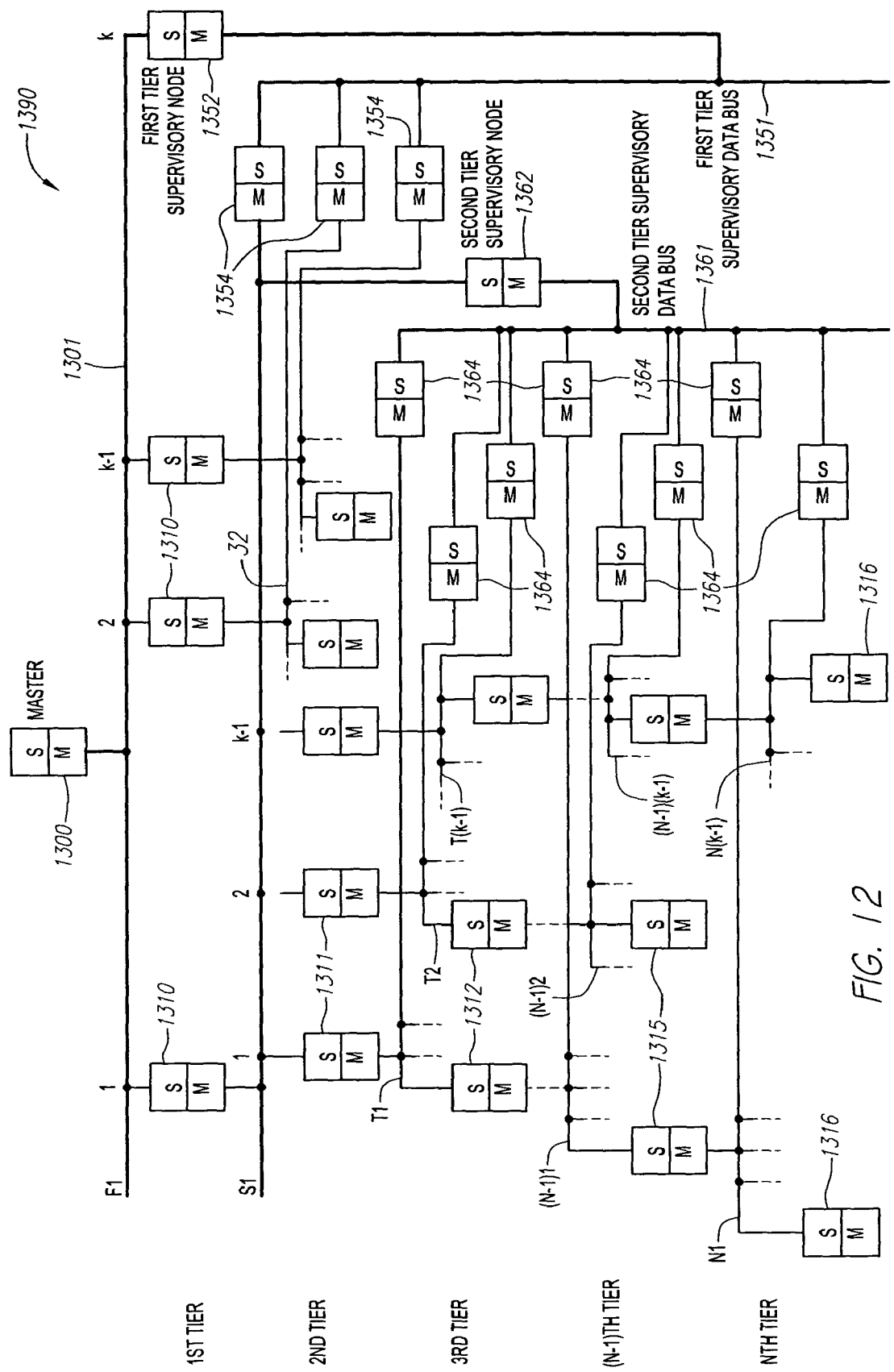
FIG. 12 is a diagram of another embodiment of a hierarchical control network having a matrix architecture in accordance with various aspects of the invention.

If the control network is large and/or has many levels or buses, then the supervisory network can be expanded by providing additional lower-tier supervisory levels, including lower-tier supervisory buses, configured with a control structure similar to the hierarchical control network of, e.g., FIG. 7, 8 or 10, oriented and connected so as to provide cross-bus communication among the different tiers or buses of the main hierarchical control network. FIG. 12 is a diagram of a matrix control network 1390 with an expanded supervisory network according to a preferred embodiment as described herein, generally capable of monitoring more lower tiers, and in some cases providing more flexible monitoring capability, than the supervisory network shown in the embodiment of FIG. 11. As illustrated in FIG. 12, the supervisory network comprises a first-tier supervisory master node 1352 connected to a first-tier common supervisory data bus 1351. A plurality of first-tier supervisory slave nodes 1354 are connected to the supervisory data bus 1351. Each of the first-tier supervisory slave nodes 1354 may also be connected to its own second-tier common supervisory data bus, such as second-tier supervisory data bus 1361 depicted in FIG. 12, via an intermediary second-tier supervisory master node 1362. One or more second-tier supervisory slave nodes 1364 may be connected to the second-tier supervisory data base 1361.

Where the fan-out of the first-tier supervisory master node 1352 is limited, the additional second-tier common supervisory data buses may allow for additional supervisory nodes to be connected to lower-tier data buses of the main hierarchical control network, thereby expanding the monitoring capability of the supervisory network. In a preferred embodiment in accordance with the principles and network architecture illustrated in FIG. 12, the first-tier supervisory master node 1352, first-tier supervisory slave nodes 1354, second-tier supervisory master node 1362, and second-tier supervisory slave nodes 1364 each comprise a downlink transceiver and an uplink transceiver, and may be configured, for example, in accordance with the node 603 depicted in FIG. 6. In FIG. 12, the uplink transceiver portion of each node is denoted with an "S" (for Slave), while the downlink transceiver portion of each node is denoted with an "M" (for Master).

Each of the first-tier supervisory slave nodes 1354 and second-tier supervisory slave nodes 1364 is connected to one of the lower-tier buses, as illustrated in FIG. 12, and each of the first-tier supervisory slave nodes 1354 and second-tier supervisory slave nodes 1364 monitors the communications occurring on the particular lower-tier bus to which it is connected. Information monitored by the first-tier supervisory slave nodes 1354 and second-tier supervisory slave nodes 1364 is communicated, directly or indirectly, over the supervisory data bus 1351 to the first-tier supervisory master node 1352 either on an as-needed or a regular basis. The first-tier supervisory master node 1352 may relay the information to the first-tier master node 1300 over the first-tier common bus 1301.

The existence of the second-tier supervisory master node 1362 in the network structure of FIG. 12 allows physical separation of the second-tier supervisory data bus 1361 from the data bus (in this example, second-tier data bus S1) of the main hierarchical control network. The second-tier supervisory master node 1362 is therefore free to communicate with (e.g., poll) the various second-tier supervisory slave nodes 1364, without having to be concerned about potential collisions with data being communicated over the second-tier data bus S1 to the second-tier slave nodes 1311 from the appropriate first-tier slave/second-tier master node 1310. In other words, the second-tier supervisory data bus 1361 is a dedicated bus ordinarily used for supervisory functions, as opposed to control functions.

The same principle of adding a second-tier supervisory data bus 1361 with second-tier supervisory slave nodes 1364 can be extended by the addition of lower-tier supervisory data buses, just as lower-tier data buses may be added to the main hierarchical control network (as explained earlier herein, for example, with respect to the control network shown in FIG. 10). The result is a supervisory network that is as large and flexible as the situation demands. In addition, speed of monitoring may be increased by providing second or lower tier supervisory data buses. The number of supervisory nodes at a given tier or bus may be reduced by the addition of one or more lower-tier supervisory data buses, thereby reducing the time need to poll the supervisory nodes on the upper-tier data bus. Those skilled in the art will appreciate that the number of tiers and buses in the supervisory network, and the number of supervisory nodes for each tier or bus, will depend upon the particular application and the structure (i.e., number of tiers and buses, and the arrangement thereof) of the main hierarchical control network.

As with the network structure of FIG. 11, the resulting network structure depicted in FIG. 12 may be viewed as a "matrix" architecture due to the intersection of control paths emanating downward from a single master node 1300 with the supervisory paths emanating across the control network from a single supervisory master node 1352. It is possible that all of the buses in each tier of the main hierarchical control network can be connected to one of the supervisory nodes, so as to provide comprehensive supervision and monitoring of all of the buses at each level of the main hierarchical control network, and preferably only one supervisory node is attached to any given bus of the main hierarchical control network. It is not necessary, however, that each of the buses of the main hierarchical control network have a supervisory node attached to it.

While various communication methods may be used in connection with the embodiments shown in FIGS. 11 and 12, a polling scheme is preferred over, for example, a voting scheme. In other words, the master node for each bus communicates with each slave node on the bus in a designated time slot. The slave nodes may be polled sequentially, or in some other order, depending upon the particular application. Generally, the slave node waits until the master node sends a polling signal to the slave node before the slave node attempts to communicate over the bus. In this manner, collisions are avoided, as the master node communicates with only one slave node at a given time. Use of a polling communication scheme can be efficient and effective, and does not require the need for arbitration of competing signals, as may be required in a voting scheme. In a voting communication scheme, unlike a polling scheme in which collisions are avoided, a collision of competing signals can require a relatively long time to resolve, and for control to be effectively re-established. Also, the data bits in a data burst can be relatively short in a polling scheme, relative to the size of the data bits used in a voting scheme.

In a preferred embodiment, communication over a common bus is carried out using time division multiplexing, wherein the master node for a particular bus polls the slave nodes on the bus sequentially or otherwise in different time slots. In a preferred embodiment, a special supervisory time slot is set aside for communication between the master node and the supervisory node connected to the particular common bus.

FIGS. 13A and 13B are timing diagrams for communication in a hierarchical control network having a matrix architecture, such as illustrated in FIG. 11 or 12, wherein a supervisory time slot is utilized. As illustrated first in FIG. 13A, in normal operation a master node (such as first-tier master node 1200 or 1300, or any other master node) alternates between a "command mode" (or "master mode") and a "listen mode" (or "slave mode") within a master node time frame 1400. In a slave node command/listen time segment 1405 of the master node time frame 1400, the master node polls the slave nodes by first commanding and then awaiting a response from each slave node. The master node thus alternates between a slave node command time slot 1411 and a slave node listen time slot 1412, commanding the slave node in the slave node command time slot 1411, and listening to the slave node in the slave node listen time slot 1412. Following the slave node command/listen time segment 1405, the master node time frame includes a supervisory node command/ask time segment 1406 and a supervisory node response time segment 1407. In the supervisory node command/ask time segment 1406, the master node transmits a command to the supervisory node, or else requests certain information from the supervisory node. In the supervisory node response time segment 1407, the master node awaits a response, if any, from the supervisory node.

The master node time frame 1400 is repeated so as to effectuate control of the hierarchical control network, and also provide for supervisory monitoring functions by the supervisory network. Thus, as illustrated in FIG. 13A, the master node returns to polling the slave nodes (i.e., alternating between slave node command time slots 1411 and slave node listen time slots 1412) at the end of the supervisory node response time segment 1407.

During the supervisory node response time segment 1407, the master node temporarily enters a listen or "slave" mode. In one embodiment as described herein, if the supervisory node observes an illegal operation by the master node, then the supervisory node can shut the master node down by commanding the master node appropriately during the supervisory node response time segment. Such a situation is illustrated in FIG. 13B, which, like FIG. 13A, illustrates a master node time frame 1450 comprising a slave node command/listen time segment 1455 (including slave node command time slots 1461 and a slave node listen time slots 1462), a supervisory node command/ask time segment 1456, and a supervisory node response time segment 1457. Assuming that the supervisory node detecting, e.g., an illegal operation by the master node during the slave node command/listen time segment 1455, or the supervisory node command/ask time segment 1456, the supervisory node can, during the supervisory node response time segment 1456, instruct the master node to shut down.

The shut down capability by the supervisory node may be utilized regardless of which tier the master node controls. If the master node is on a tier other than the first tier, then the supervisory node can utilize a secondary means for shutting down the lower-tier master node in case the direct shut down command does not succeed. The supervisory node may send a shut down request to the first-tier supervisory node (such as first-tier supervisory node 1252 in FIG. 12, or 1352 in FIG. 13) via the supervisory network, and the first-tier supervisory node then can transfer the request to the first-tier master node (e.g., first-tier master node 1200 or 1300) which will shut down the lower-tier master node by issuing the appropriate command through the main hierarchical control network channels.

Generally, in absence of failure, supervisory nodes only listens to the data bus to which it is attached, and does not interfere with the control scheme of the main hierarchical control network. However, in some embodiments, it is possible for the supervisory node to take on additional control functionality.

In one embodiment as described herein, the first-tier supervisory master node 1252 (or 1352) is programmed to provide redundant backup control for the first-tier master node 1200 (or 1300). In such an embodiment, the first-tier supervisory node 1252 may detect a failure of the first-tier master node 1200 in the same manner as the first-tier slave nodes 1210 do, or by detecting an illegal operation, or both. Upon detecting a failure of the first-tier master node 1200, the first-tier supervisory node 1252 may substitute itself for the first-tier master node 1200, taking over some or all of the functionality of the first-tier master node 1200. Should the first-tier supervisory node 1252 thereafter fail, one of the first-tier slave nodes 1210 can then take over as first-tier master node in place of the first-tier supervisory node 1252, according to the prioritized redundant backup control scheme described earlier herein.

The above principles may be extended to apply to each of the buses which are monitored by a supervisory node, such that the supervisory node of a given bus can shut down the master node of that particular bus upon detecting a failure of the master node, and thereafter assume the responsibilities and functionality of the master node for that bus.

In another embodiment as described herein, the first-tier supervisory master node 1252 (or 1352) is similarly programmed to detect a failure of the first-tier master node 1200 by, e.g., detecting an illegal operation. Upon detecting a failure of the first-tier master node 1200, the first-tier supervisory node 1252 commands the first-tier master node 1200 to shut down, and temporarily takes over some or all of the functionality of the first-tier master node 1200. For example, the first-tier supervisory master node 1252 may temporarily take over only the critical functions of the first-tier master node 1200. Within a pre-programmed failure detection time frame, as previously described herein with respect to redundant backup control, one of the first-tier slave nodes 1210 will detect the fact that the first-tier master node 1200 has failed (as the first-tier master node 1200 has been shut down by the first-tier supervisory master node 1252), and the first-tier slave node 1210 detecting the failure of the first-tier master node 1200 will then automatically take over as the new first-tier master node. When such a substitution occurs, the first-tier supervisory node 1252 relinquishes its responsibilities of the first-tier master node 1200 that it had temporarily assumed, and returns to monitoring the first-tier data bus 1201.

In such a manner, both effective monitoring of the master node and redundant backup control are provided. The first-tier supervisory master node 1252 need not be programmed with all of the capabilities of the first-tier master node 1200, since one of the first-tier slave nodes 1210 automatically takes over as the first-tier master node within a relatively short period of time.

Again, the above principles may be extended to apply to each of the buses which are monitored by a supervisory node, such that the supervisory node of a given bus can shut down the master node of that particular bus upon detecting a failure of the master node, and thereafter temporarily assume the responsibilities and functionality of the master node for that bus, until a slave node takes over as the new master node for the bus.

Figure 14:
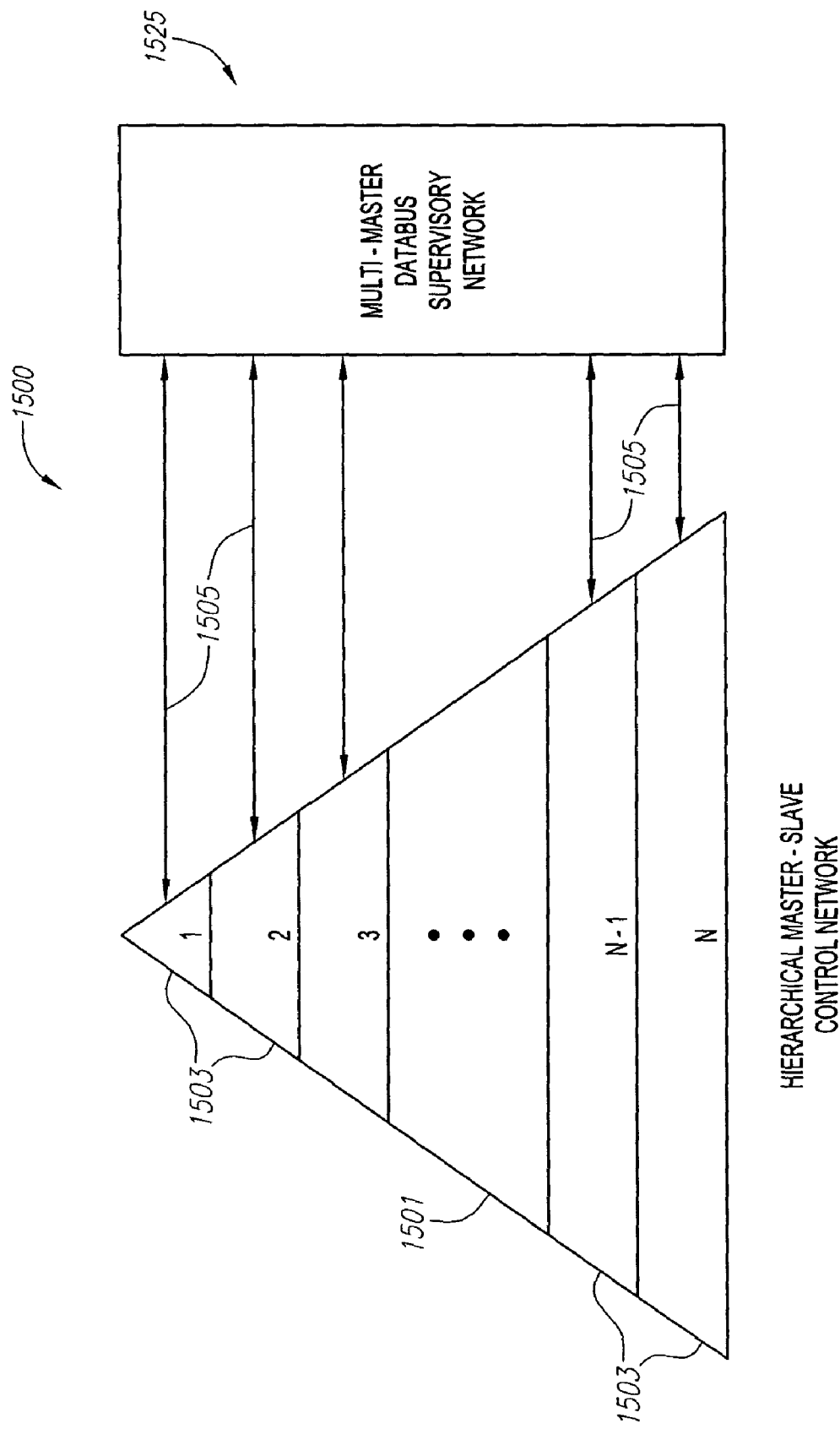
FIG. 14 is a conceptual diagram of a multi-master data bus supervisory network connected to a hierarchical master-slave control network for the purpose of monitoring and/or supervising the various buses at different level tiers of the hierarchical master-slave control network.

Other embodiments of network architectures as disclosed herein include one or more multi-master data buses in a supervisory network, for the purpose of monitoring and/or control of the various data buses in the main hierarchical control network. FIG. 14 is a conceptual diagram of a matrix control network 1500 including a multi-master data bus supervisory network 1525 connected to a hierarchical master-slave control network 1501 for the purpose of monitoring and/or supervising the various buses at different level tiers of the hierarchical master-slave control network 1501. As illustrated in FIG. 14, the hierarchical master-slave control network 1501 comprises a plurality of levels or tiers 1503 (1 through N), each tier 1503 conceptually representing one or more data buses at the respective hierarchical level of the master-slave control network 1501. Each of the data buses represented at each tier 1503 is preferably connected to a plurality of nodes organized according to a master-slave hierarchy, such as illustrated, for example, in FIG. 10. The multi-master data bus supervisory network 1525 is coupled by monitoring lines 1505 to the various tiers 1503 of the hierarchical master-slave control network 1501, to allow monitoring of the nodes at the different tiers 1503 of the hierarchical master-slave control network 1501. In one aspect, the multi-master data bus supervisory network 1525 allows rapid communication in the "vertical" direction across the tiers 1503 of the hierarchical master-slave control network 1501, thereby allowing more rapid response by the top-tier master node than might otherwise be possible to events needing urgent attention, such as exception or error conditions.

Details of a preferred matrix control network 1690 with a multi-master data bus supervisory network are illustrated in FIG. 15. The primary hierarchical control network shown in FIG. 15 is similar to that shown by itself in FIG. 10, and in connection with other supervisory network structures in FIGS. 11 and 12. In addition to the primary hierarchical control network, a supervisory network is added and connected to one or more of the control network data buses, so as to allow monitoring of communications at the mid- and lower-tier levels, and to further allow the possibility of redundant backup control and/or communication with respect to the master nodes at the various different levels.

In FIG. 15, the matrix control network 1690 (generalized to N levels or tiers, as in FIG. 10, 11 or 12) comprises a main hierarchical control network including a first-tier master node 1600 connected to a first-tier data bus 1601 (designated F1 in FIG. 15), and a plurality of first-tier slave nodes 1610 connected to the first-tier data bus 1601. Each of the first-tier slave nodes 1610 is capable of acting as a second-tier master node with respect to a second-tier data bus (designated as S1, S2 . . . S(k-1) in FIG. 15), and each of the second-tier data buses preferably has a plurality of second-tier slave nodes 1611 connected to it. The main hierarchical control network may be expanded downward in a similar manner for an arbitrary number N levels, with each of the second-tier slave nodes 1611 potentially being connected as third-tier master nodes to third-tier data buses, and so on. The main hierarchical control network may have all of the functionality and features of the control network 1150 illustrated in FIG. 10, for example, and described earlier herein.

As further illustrated in FIG. 15, a supervisory network is preferably added to the main hierarchical control network for the purposes previously described herein. Accordingly, a first-tier multi-master common supervisory data bus 1651 is provided in the matrix control network 1690, and a plurality of first-tier supervisory nodes 1652 and 1660 are connected to the first-tier multi-master common supervisory data bus 1651, including a "top-level" first-tier supervisory node 1652 connected to the first tier data bus 1601 and a plurality of other first-tier supervisory nodes 1660 each connected to a lower-tier data bus of the main hierarchical control network. Each first-tier supervisory node 1652, 1660 preferably comprises an uplink transceiver and a downlink transceiver, and may generally be configured, for example, in accordance with the node 603 depicted in FIG. 6. In FIG. 15, the uplink transceiver portion of each node is denoted with "S" (for Slave), while the downlink transceiver portion of each node is denoted with "MM" (for Multi-Master).

In operation, the top-level first-tier supervisory node 1652 monitors activity on the first-tier data bus 1601, and each of the other first-tier supervisory nodes 1660 monitors activity on the lower-tier data bus of the hierarchical control network to which it is connected. If an event needing urgent attention occurs on one of the lower-tier data buses, then the first-tier supervisory node 1660 detecting the event sends a message over the first-tier multi-master common supervisory data bus 1651 to the appropriate supervisory node, typically the top-level first-tier supervisory node 1652 (although the error message may be broadcast to all of the first-tier supervisory nodes 1652, 1660).

The top-level first-tier supervisory node 1652 is polled by the first-tier master node 1600 periodically, as if it were any of the first-tier slave nodes 1610. When the first-tier master node 1600 polls the top-level first-tier supervisory node 1652, the first-tier master node 1600 learns of the event requiring urgent attention, and responds accordingly by either issuing commands down the hierarchical control network, or else optionally, if only a limited response is needed, sending a responsive message to the lower node or data bus through the first-tier supervisory nodes 1652, 1660 via the first-tier multi-master common supervisory data bus 1651. When initially polling the top-level first-tier supervisory node 1652, the first-tier master node 1600 generally limits its inquiry to whether or not an error or exception has occurred at some lower level. If the top-level first-tier supervisory node 1652 answers the poll by indicating an error or exception has occurred, then the first-tier master node 1600 sends a control message to the top-level first-tier supervisory node 1652 requesting specific details of the exception or error condition. Using this technique, the first-tier master node 1600 is able to rapidly learn of events requiring urgent attention at even the lowest tiers of the hierarchical control network, and to respond quickly thereto.

The first-tier supervisory nodes 1652, 1660 connected to the first-tier multi-master common supervisory data bus 1651 may use a conventional protocol to gain access to and communicate over the first-tier multi-master common supervisory data bus 1651. Conventional protocols (including Ethernet protocols) exist in the art of local area networks that may be used or readily adapted in the context of the first-tier multi-master common supervisory data bus 1651. Such protocols generally include mechanisms for handling collisions between competing nodes attempting to gain control of the common bus at the same time. For example, if a cyclic redundancy check (CRC) field for the received message does not match the expected value, then a collision or other error is assumed, and the competing supervisory nodes will access the multi-master common supervisory data bus 1651 bus according to a relative, predetermined priority. However, collisions are expected to be very rare, since communication over the first-tier multi-master common supervisory data bus 1651 is only necessary when an exception condition requiring attention is detected at one of the lower tiers. As a result, the main hierarchical control network maintains a very efficient master-slave communication protocol (i.e., a polling protocol) for allowing the master nodes at the various tiers to control the slave nodes at each such tier, while at the same time providing a mechanism for intermittent rapid communication between the lower tiers and upper or first tier via supervisory nodes relying upon a different protocol suitable for a network having multiple master nodes but only requiring occasional communication between the master nodes.

The supervisory network may comprise additional multi-master supervisory data buses connected to the first-tier data bus 1601 through one or more supervisory nodes (e.g., first-tier supervisory node 1653), to allow monitoring of additional data buses of the hierarchical control network. Similarly, the supervisory network may include one or more second-tier supervisory data buses, such as second-tier multi-master supervisory data bus 1661, to provide additional supervisory nodes for monitoring data buses of the hierarchical control network. As illustrated in FIG. 15, the second-tier multi-master supervisory data bus 1661 may be connected to a plurality of second-tier supervisory nodes 1672, 1680, including a top-level second-tier supervisory node 1672 and a plurality of other second-tier supervisory nodes 1680. As with the first-tier supervisory nodes 1652, 1660, each second-tier supervisory node 1672, 1680 preferably comprises an uplink transceiver and (denoted "S" in FIG. 15) a downlink transceiver (denoted "MM" in FIG. 15), and may generally be configured, for example, in accordance with the node 603 depicted in FIG. 6. In operation, the top-level second-tier supervisory node 1672 monitors activity on the second-tier data bus 1602, and each of the other first-tier supervisory nodes 1680 monitors activity on the lower-tier data bus of the hierarchical control network to which it is connected. If an event needing urgent attention occurs on one of the lower-tier data buses, then the second-tier supervisory node 1680 detecting the event sends a message over the second-tier multi-master common supervisory data bus 1661 to the appropriate supervisory node, typically the top-level second-tier supervisory node 1672. The top-level second-tier supervisory node 1672 is polled by the appropriate second-tier master node 1610 periodically, as if it were any of the second-tier slave nodes 1611. When the second-tier master node 1610 polls the top-level second-tier supervisory node 1672, the second-tier master node 1610 learns of the event requiring urgent attention, and responds accordingly by either issuing commands down the hierarchical control network, or else, if only a limited response is needed, sending a responsive message to the lower node or data bus through the second-tier supervisory nodes 1672, 1680 via the second-tier multi-master common supervisory data bus 1671, or else relaying the message to the first-tier master node 1600 when polled by the first-tier master node 1600, or any combination of these responses. Also, the first-tier master node 1660 (if any) connected to the second tier data bus 1602 may also learn of the event by listening to communications across the second tier data bus 1602, and may respond or else relay the information to the first-tier master node 1600, if desired.

Using the above techniques, the first-tier master node 1600 and other master nodes (such as first-tier master node 1610) are able to rapidly learn of events requiring urgent attention at even the lowest tiers of the hierarchical control network, and to respond quickly thereto.

The second-tier supervisory nodes 1672, 1680, as with the first-tier supervisory nodes 1652, 1660, may use a conventional protocol to gain access to and communicate over the second-tier multi-master common supervisory data bus 1661. As before, collisions are expected to be infrequent, since communication over the second-tier multi-master common supervisory data bus 1661 is only necessary when an urgent condition requiring attention is detected at one of the lower tiers.

In one aspect, the addition of the supervisory network to the main hierarchical control network may be viewed as creating a matrix-type architecture, due to the intersection of control paths emanating downward from a single master node 1600, with supervisory paths emanating across the control network from the various supervisory nodes 1660. In the absence of the supervisory network, information from the lowest tiers can only reach a higher-tier master node (e.g., the first-tier master node 1600) by propagating up each tier through a master/slave data exchange at each level, until eventually it reaches the appropriate higher-tier master node. In the case of an emergency, or where time of response by the higher-tier master node is critical, the delay in communicating the information from the lowest tiers to the higher-tier master node can be detrimental. The supervisory network allows information, especially information that is urgent, to reach the higher-tier master node faster than would be possible in the absence of the supervisory network, by bypassing the required master/slave data exchange at each intervening tier.

Not all buses or tiers need to be monitored by the supervisory network. However, it is possible that all of the buses in each tier of the main hierarchical control network (i.e., the control network in the absence of the supervisory network) can be connected to a supervisory node, so as to provide comprehensive supervision and monitoring of all of the buses at each level of the main hierarchical control network.

In one aspect, the supervisory network may allow faster response by the first-tier master node or other upper-tier master nodes to situations requiring attention in the lower tiers. An exemplary application of the control network of FIG. 12 or 13 is a building control system which electronically controls the various systems and sub-systems of a building (e.g., air conditioning, fire alarm, power, and so on). In such an exemplary embodiment, the first-tier master node may be, for example, the top-level building controller. The second-tier master nodes may each be building wing controllers. The third-tier master nodes may each be floor controllers for their respective wings. The fourth-tier master nodes may each be office controllers for their respective floor and wing. The fifth-tier master nodes (or fourth-tier slave nodes) may each be individual room controllers for their respective floor, wing and office. A supervisory network may comprise supervisory nodes connected to each of the lowest-tier buses. Should, for example, a fire or other emergency occur in one of the rooms of the building, the supervisory network could immediately relay the information to the top-level building controller (i.e., the first-tier master node), which could take the appropriate action, without requiring the delay of intermediate communications from tier to tier until the top level tier is reached. Furthermore, the supervisory node first identifying the emergency or exception condition may broadcast it to all of the other supervisory nodes on the supervisory data bus, thereby allowing the knowledge to be quickly propagated throughout the entire system.

In another exemplary application, the hierarchical control system including the supervisory network may be used to control a robotics system. The hierarchical control system can readily be miniaturized and is easily expandable, making it ideal for robotics applications.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A control network system, comprising:
 a plurality of control network data buses arranged in a hierarchical structure, said control network data buses including a first-tier data bus and a plurality of lower-tier data buses;
 a plurality of control network nodes connected to said control network data buses, each of said control network data buses communicatively coupled to one or more of said control network nodes;
 a supervisory bus physically distinct from said network data buses; and
 a plurality of supervisory nodes connected to said supervisory bus and to said control network data buses, said plurality of supervisory nodes configured to monitor said control network data buses and to alert one or more control network nodes coupled to said first-tier data bus of events occurring on the lower-tier data buses.

2. The control network system of claim 1, wherein each of said control network nodes comprises (i) an uplink transceiver, and (ii) a downlink transceiver that communicates over a different data bus than said uplink transceiver.

3. The control network system of claim 1, wherein at least one of the control network nodes connected to a given data bus is configured to operate as a master node, and the remainder of the control network nodes connected to the data bus are configured to operate as slave nodes.

4. The control network system of claim 3, wherein each of said supervisory nodes is configured as a slave node with respect to the data bus which it monitors.

5. The control network of claim 3, wherein the supervisory node takes over for the master node on the data bus which the supervisory node is monitoring upon detecting a failure of the master node.

6. The control network system of claim 4, wherein the master node for each data bus systematically polls each of the slave nodes as well as the supervisory node that monitors the data bus.

7. The control network system of claim 4, wherein a supervisory node detecting an error or exception condition on the bus it is monitoring transmits an error message over said supervisory bus.

8. The control network system of claim 7, wherein said error message comprises a broadcast message intended for reception by each of said supervisory nodes.

9. The control network system of claim 1, wherein said control network nodes are arranged in a loop configuration on at least one of said plurality of said control network data buses.

10. The control network system of claim 9, wherein said supervisory nodes are arranged in a loop configuration on said supervisory bus.

11. A control network system, comprising:
a plurality of nodes;
a plurality of control network data buses connected to distinct sets of said nodes and arranged in a hierarchical structure, said plurality of control network data buses comprising a first-tier control network data bus and a plurality of lower-tier data buses, each distinct set of nodes comprising a master node and one or more slave nodes;
a supervisory bus physically distinct from said network data buses;
a plurality of supervisory monitoring nodes connected to said supervisory bus and to said lower-tier buses, each of said supervisory monitoring nodes configured to monitor one of said lower-tier buses; and
at least one supervisory reporting node communicatively coupled to said first-tier control network data bus and to said supervisory bus, whereby one or more control network nodes coupled to said first-tier control network data bus are apprised of events occurring on the lower-tier data buses via communications over said supervisory bus.

12. The control network of claim 11, wherein each of said supervisory monitoring nodes comprises a first transceiver connected to one of said lower-tier data buses, and a second transceiver connected to said multi-master supervisory data bus.

13. The control network of claim 11, whereby communications on said lower-tier buses monitored by said supervisory monitoring nodes are made accessible to the first-tier master node.

14. The control network system of claim 11, wherein the master node and one or more slave nodes on each of said control network data buses are arranged in a loop configuration.

15. The control network system of claim 14, wherein said supervisory nodes are arranged in a loop configuration on said supervisory bus.

16. A matrix control network, comprising:
a hierarchical control network, said hierarchical control network comprising a plurality of data buses arranged in a hierarchical structure, said data buses including a first-tier data bus and a plurality of lower-tier data buses;
a plurality of control network nodes arranged in a hierarchical structure according to their relative positioning in the hierarchy of data buses, each of said data buses communicatively coupling a plurality of said control network nodes; and
a supervisory network, said supervisory network comprising:
a supervisory communication bus physically distinct from the data buses;
a plurality of supervisory nodes communicatively coupled to said supervisory communication bus, said supervisory nodes including a plurality of supervisoring monitoring nodes each configured to monitor at least one of the lower-tier data buses of said hierarchical control network, and at least one supervisory reporting node communicatively coupled to said first-tier data bus, whereby one or more control network nodes coupled to said first-tier data bus are apprised of events occurring on the lower-tier data buses.

17. The matrix control network of claim 16, wherein at least one of the control network nodes communicatively coupled to a given data bus is configured to operate as a master node and the other control network nodes communicatively coupled to that data bus are configured to operate as slave nodes.

18. The matrix control network of claim 17, wherein each of said supervisory monitoring nodes comprises a supervisory node slave unit and a supervisory node master unit, said supervisory node slave unit connected to one of said data buses of said hierarchical control network, and said supervisory node master unit connected to said supervisory communication bus.

19. The matrix control network of claim 17, wherein said supervisory nodes communicate over said supervisory communication bus according to a master-slave communication protocol.

20. The matrix control network of claim 18, wherein the master node for each data bus systematically polls the slave nodes connected to the data bus.

21. The matrix control network of claim 20, wherein the master node for each data bus polls the supervisory node slave unit of the supervisory monitoring node connected to the data bus.

22. The matrix control network of claim 21, wherein the supervisory node slave unit of each supervisory monitoring node refrains from transmitting over the data bus to which the supervisory monitoring node is connected unless authorized by the master node connected to the data bus.

23. The matrix control network of claim 16, wherein a supervisory monitoring node detecting an error or exception condition transmits an alert message over said supervisory communication bus.

24. The matrix control network of claim 23, wherein said alert message is a broadcast to all of the supervisory nodes communicatively coupled to said supervisory communication bus.

25. The matrix control network of claim 23, wherein:
one of the control network nodes communicatively coupled to said first-tier data bus is configured to operate as a first-tier master node;
said supervisory reporting node is configured to communicate with said first-tier master node; and
said supervisory reporting node relays information pertaining to said alert message to said first-tier master node.

26. The matrix control network of claim 16, wherein each of said control network nodes comprises a control network node slave unit and control network node master unit.

27. The matrix control network of claim 26, wherein each of said control network nodes comprises a pair of transceivers and a pair of processors, a first one of said pair of transceivers being utilized by said control network node slave unit and a second one of said pair of transceivers being utilized by said control network node master unit, and a first one of said pair of processors being connected to said first one of said pair of transceivers and utilized by said control network node slave unit and a second one of said pair of processors being connected to said second one of said pair of transceivers and utilized by said control network node master unit.

28. The matrix control network of claim 27, wherein:
each of said supervisory nodes comprises a supervisory node slave unit and a supervisory node master unit; and
each of said supervisory nodes comprises a second pair of transceivers and a second pair of processors, a first one of said second pair of transceivers being utilized by said supervisory slave node unit and a second one of said second pair of transceivers being utilized by said supervisory node master unit, and a first one of said second pair of processors being connected to said first one of said second pair of transceivers and utilized by said supervisory node slave unit and a second one of said second pair of processors being connected to second one of said second pair of transceivers and utilized by said supervisory node master unit.

29. The matrix control network of claim 16, wherein said control network nodes are arranged in a loop configuration on at least one of said plurality of said data buses.

30. The matrix control network of claim 29, wherein said supervisory nodes are arranged in a loop configuration on said supervisory communication bus.

31. A method of configuring a control network system, comprising the steps of:
 arranging a plurality of data buses in a hierarchical structure, said data buses including a first-tier data bus and a plurality of lower-tier data buses;
 communicatively coupling a plurality of control network nodes to said plurality of data buses, said control network nodes arranged in a hierarchical structure according to their relative positioning in the hierarchy of data buses;
 communicatively coupling a plurality of supervisory nodes to a supervisory communication bus physically distinct from the data buses;
 monitoring communications over said data buses using said supervisory nodes;
 communicating among said supervisory nodes over said supervisory communication bus according to a master-slave communication protocol; and
 alerting one or more control network nodes coupled to said first-tier data bus of events occurring on the lower-tier data buses, via the supervisory nodes coupled to said supervisory bus.

32. The method of claim 31, wherein said step of communicatively coupling said plurality of control network nodes and said plurality of data buses in said hierarchical control network structure comprises the step of connecting each of said data buses to one or more of said control network nodes, and configuring at least one of the control network nodes attached to a given data bus to operate as a master node and the remainder of the control network nodes attached to the given data bus to operate as slave nodes.

33. The method of claim 32, further comprising the step of, for each supervisory node, connecting a supervisory node slave unit to one of said data buses, wherein the step of communicatively coupling said plurality of supervisory nodes to said supervisory communication bus comprises the step of, for each supervisory node, connecting a supervisory node master unit to said supervisory communication bus.

34. The method of claim 33, further comprising the step of communicating among said control network nodes according to a master-slave communication protocol by systematically polling the slave nodes connected to the data bus from the master node connected to the data bus.

35. The method of claim 34, further comprising the step of polling the supervisory node slave unit connected to the data bus when polling the other slave nodes connected to the data bus.

36. The method of claim 33, further comprising the step of transmitting an alert message over said supervisory communication bus when the supervisory node slave unit detects an error or exception condition on the data bus that it is monitoring.

37. The method of claim 36, wherein said alert message is broadcast to all of said supervisory nodes over the supervisory communication bus.

38. The method of claim 36, further comprising the step of relaying information pertaining to said alert message to a master node connected to a higher-tier data bus relative to the data bus which is being monitored by the supervisory node sending the original alert message.

39. The method of claim 38, wherein said master node connected to said higher-tier data bus is a first-tier master node.

40. The method of claim 33, wherein each of said control network nodes comprises a control network node slave unit and control network node master unit.

41. The method of claim 40, wherein each of said control network nodes comprises a pair of transceivers and a pair of processors, a first one of said pair of transceivers being utilized by said control network node slave unit and a second one of said pair of transceivers being utilized by said control network node master unit, and a first one of said pair of processors being connected to said first one of said pair of transceivers and utilized by said control network node slave unit and a second one of said pair of processors being connected to said second one of said pair of transceivers and utilized by said control network node master unit.

42. The method of claim 41, wherein each of said supervisory nodes comprises a second pair of transceivers and a second pair of processors, a first one of said second pair of transceivers being utilized by said supervisory slave node unit and a second one of said second pair of transceivers being utilized by said supervisory node master unit, and a first one of said second pair of processors being connected to said first one of said second pair of transceivers and utilized by said supervisory node slave unit and a second one of said second pair of processors being connected to said second one of said second pair of transceivers and utilized by said supervisory node master unit.

43. The method of claim 31, wherein said control network nodes are arranged in a loop configuration on at least one of said plurality of said data buses.

44. The method of claim 43, wherein said supervisory nodes are arranged in a loop configuration on said supervisory communication bus.

45. A control network, comprising:
 a plurality of first-tier slave nodes;
 a first common bus connecting said first-tier slave nodes in a loop configuration;
 a second physically distinct common bus connecting a plurality of second-tier slave nodes in a loop configuration, said second common bus further connected to at least one of said first-tier slave nodes functioning as a second-tier master node with respect to the second common bus; and
 a first-tier master node connected to said first common bus, said first-tier master node comprising an uplink transceiver connected to said second common bus and a downlink transceiver connected to said first common bus, wherein said uplink transceiver of said first-tier master node is configured to function as a second-tier slave node on said second common bus, thereby allowing said first-tier master node to monitor communications on said second common bus.

* * * * *